US007620831B2

(12) United States Patent
Takahashi

(10) Patent No.: US 7,620,831 B2
(45) Date of Patent: Nov. 17, 2009

(54) INFORMATION PROCESSING APPARATUS AND POWER SUPPLY CONTROL METHOD FOR INFORMATION PROCESSING APPARATUS

(75) Inventor: Yorio Takahashi, Toon (JP)

(73) Assignee: Panasonic Corporation, Osaka (JP)

( * ) Notice: Subject to any disclaimer, the term of this patent is extended or adjusted under 35 U.S.C. 154(b) by 507 days.

(21) Appl. No.: 10/585,692

(22) PCT Filed: Jan. 7, 2005

(86) PCT No.: PCT/JP2005/000127

§ 371 (c)(1), (2), (4) Date: Jul. 10, 2006

(87) PCT Pub. No.: WO2005/066963

PCT Pub. Date: Jul. 21, 2005

(65) Prior Publication Data

US 2008/0288801 A1 Nov. 20, 2008

(30) Foreign Application Priority Data

Jan. 9, 2004 (JP) ............................ 2004-003552

(51) Int. Cl.
*G06F 1/00* (2006.01)
*G06F 1/26* (2006.01)
*G06F 1/32* (2006.01)

(52) U.S. Cl. ....................... 713/324; 713/300; 713/320; 720/606; 720/610

(58) Field of Classification Search ................. 713/300, 713/320, 324; 720/606, 610
See application file for complete search history.

(56) References Cited

U.S. PATENT DOCUMENTS

| | | | | | |
|---|---|---|---|---|---|
| 5,944,832 | A * | 8/1999 | Jolley et al. | ................. | 713/300 |
| 6,006,285 | A * | 12/1999 | Jacobs et al. | .................. | 710/14 |
| 6,038,672 | A * | 3/2000 | Klein | ......................... | 713/322 |
| 6,611,658 | B1 * | 8/2003 | Takahashi | ................... | 388/800 |
| 6,654,827 | B2 * | 11/2003 | Zhang et al. | .................. | 710/62 |
| 7,099,113 | B2 * | 8/2006 | Lee et al. | .................... | 360/133 |
| 7,457,975 | B2 * | 11/2008 | Taniguchi et al. | ........... | 713/324 |
| 7,512,819 | B2 * | 3/2009 | Uehara | ....................... | 713/320 |
| 2001/0056509 | A1 | 12/2001 | Iwata | | |
| 2003/0219134 | A1 * | 11/2003 | Su et al. | ..................... | 381/104 |
| 2005/0289567 | A1 * | 12/2005 | Sun et al. | .................... | 720/610 |
| 2006/0200693 | A1 * | 9/2006 | Uehara | ....................... | 713/324 |

FOREIGN PATENT DOCUMENTS

| | | | |
|---|---|---|---|
| JP | 06259876 | A * | 9/1994 |
| JP | 09212990 | A | 8/1997 |
| JP | 11073720 | | 3/1999 |
| JP | 11149689 | A | 6/1999 |
| JP | 2000003233 | A | 1/2000 |

* cited by examiner

*Primary Examiner*—Mark Connolly
(74) *Attorney, Agent, or Firm*—Dickinson Wright, PLLC

(57) ABSTRACT

An information storage device (2) in an information processing apparatus has a power supply controller (13). The power supply controller (13) operates by being supplied with power from a continuous power supply device (8). When a depressed state of a switch (17 or 18) is changed during stoppage of power supply from a power supply device (7) to the information storage device (2), the power supply device (7) is controlled to supply power to the information storage device (2) or to the information storage device (2) and a control device (3), thereby operating a mechanism (12) for loading/ejecting the removable medium (1).

36 Claims, 16 Drawing Sheets

F I G. 1
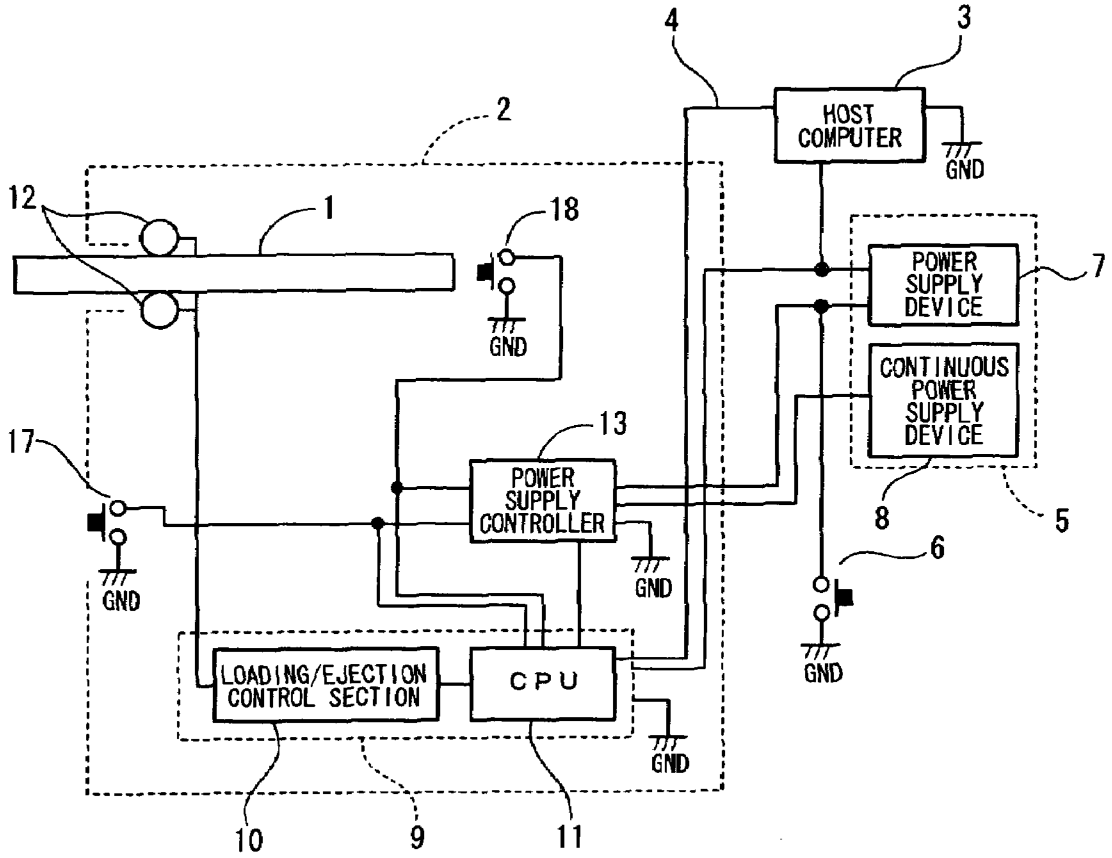

F I G. 5 B
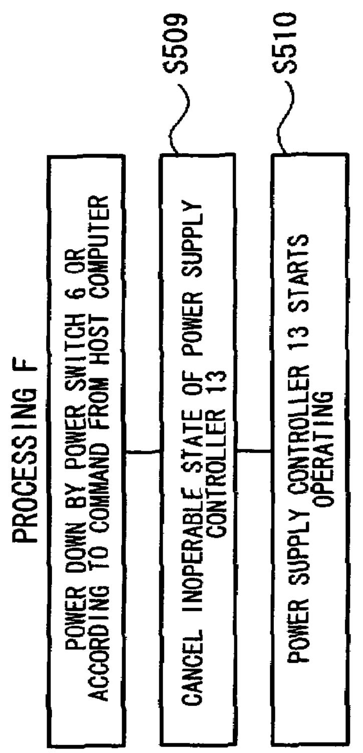
F I G. 5 A
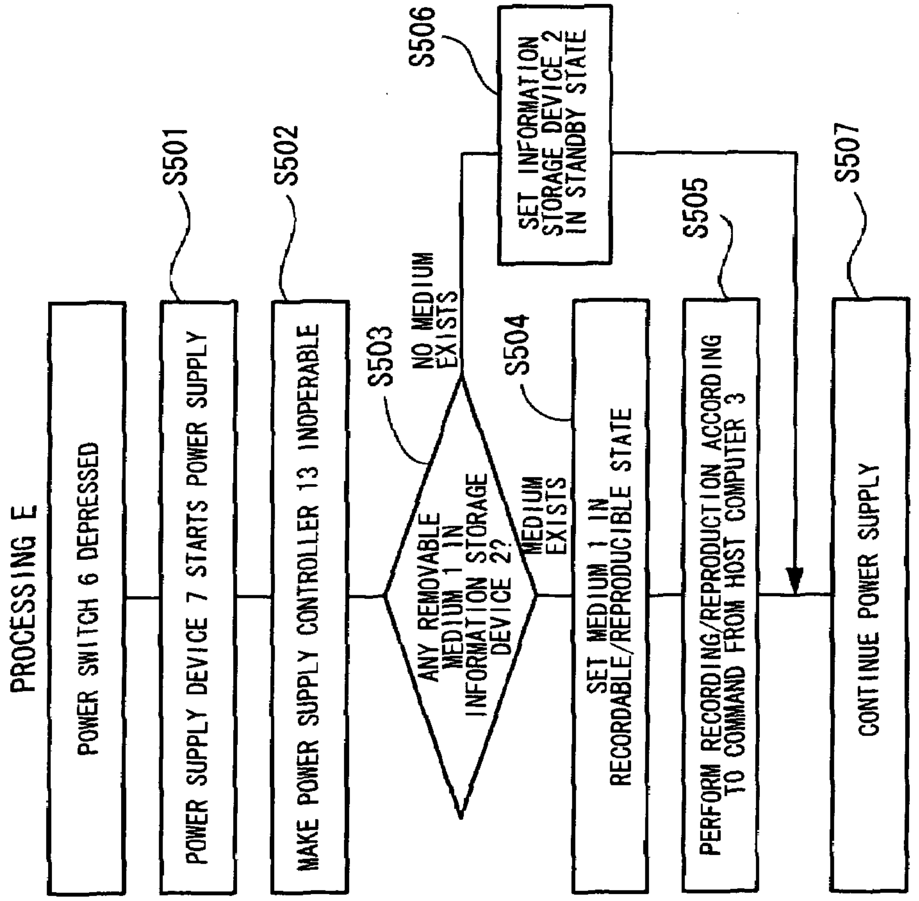

F I G. 6
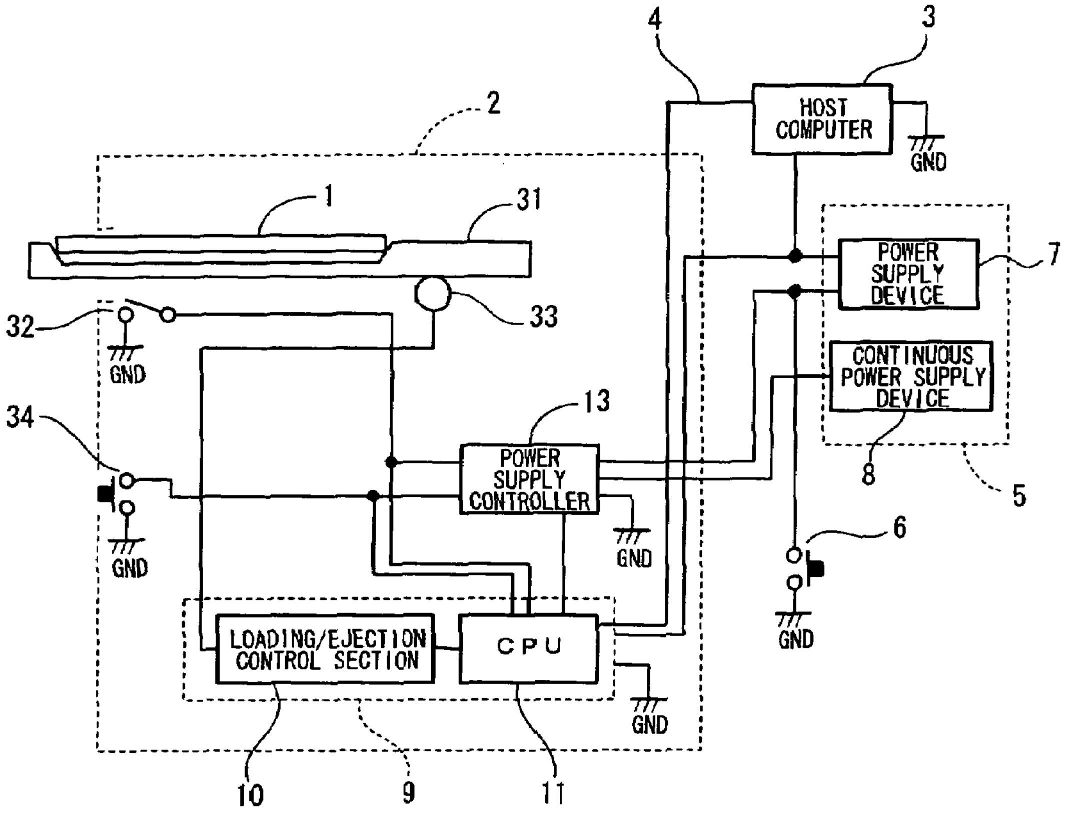
F I G. 7
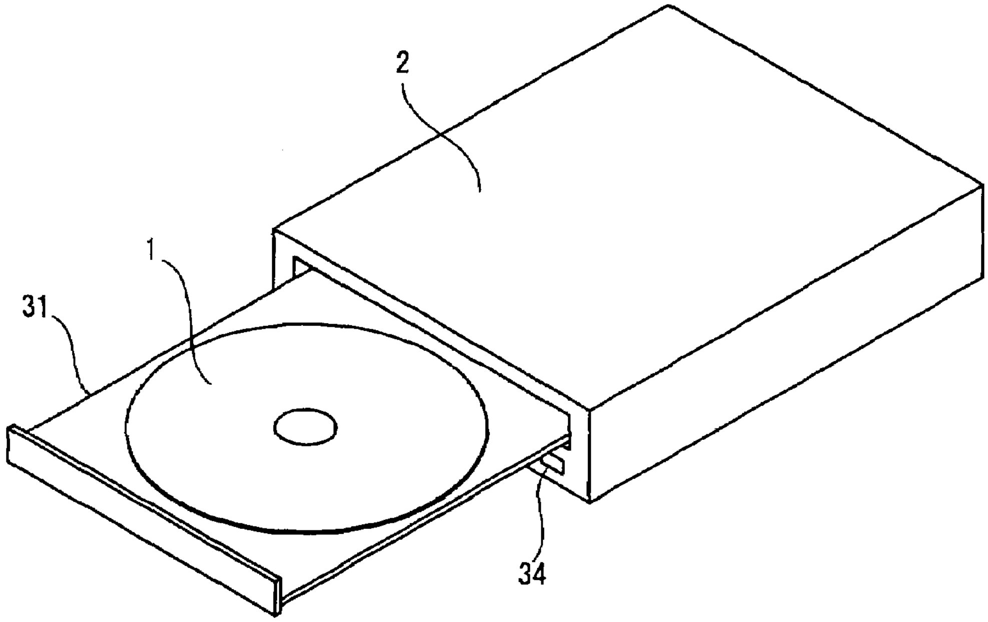

F I G. 9 A
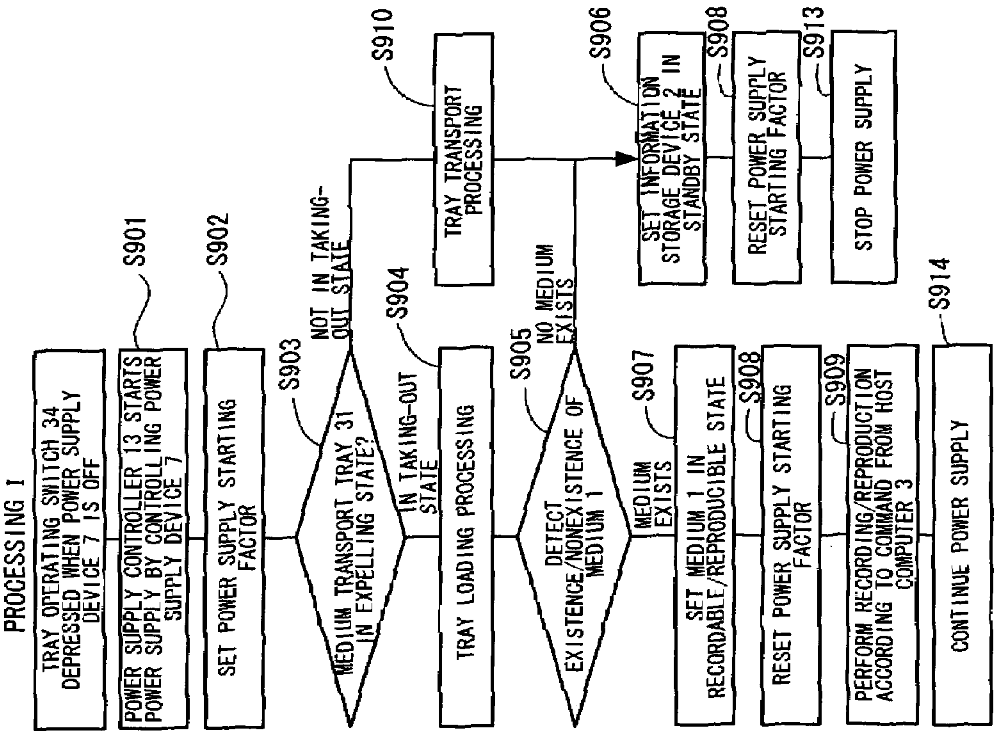
F I G. 9 B
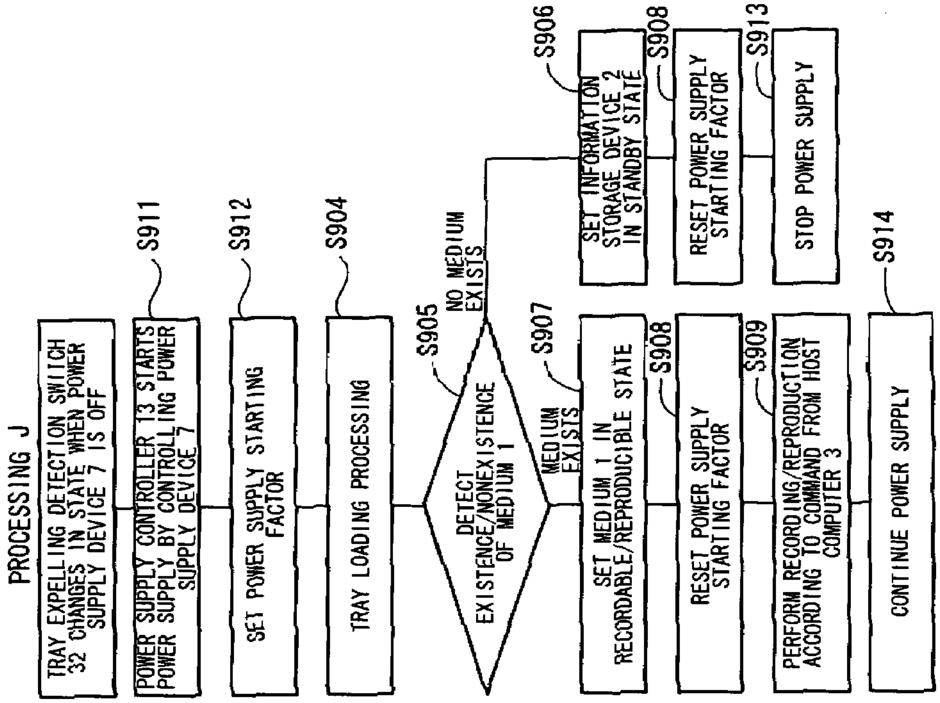

F I G. 17
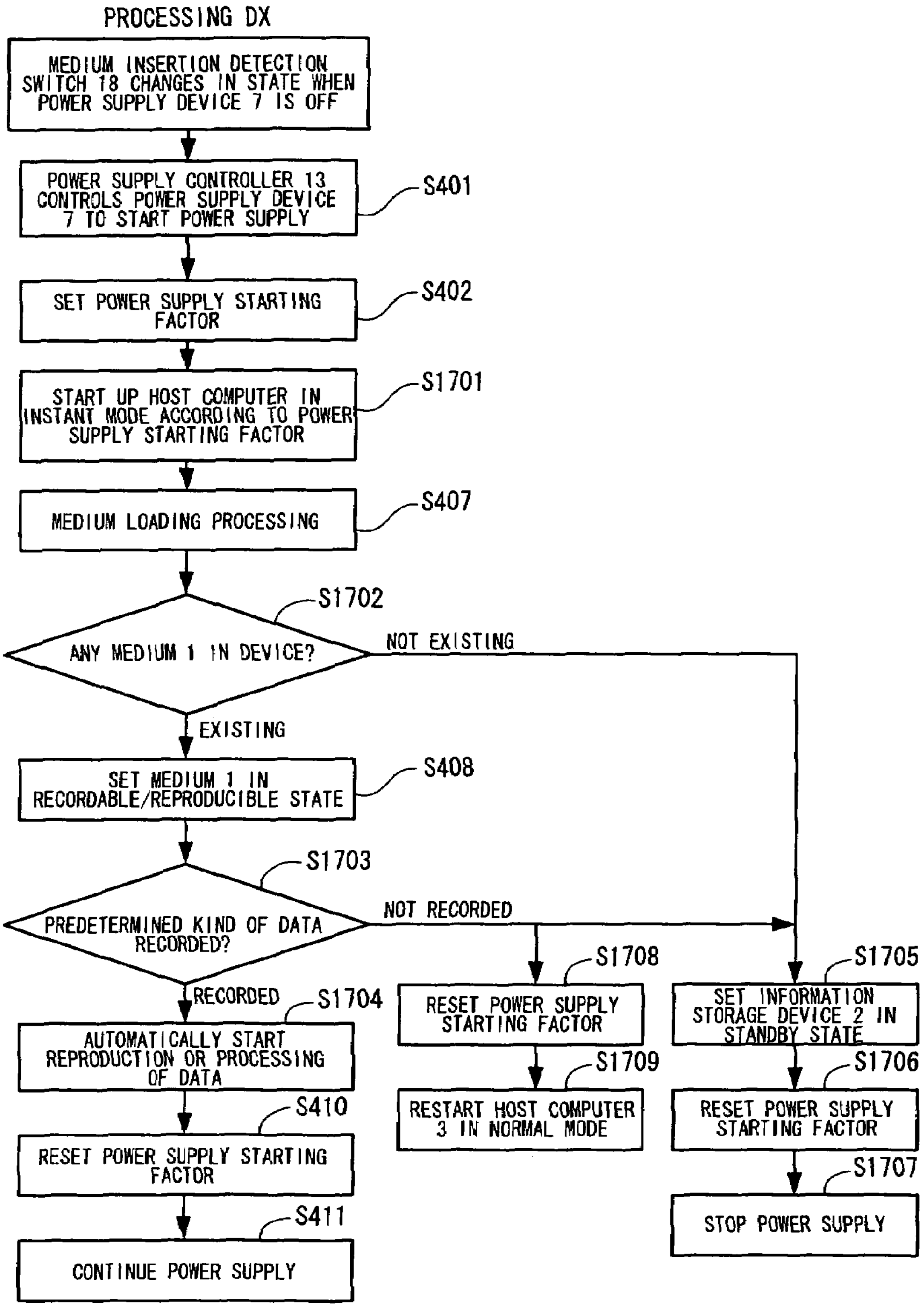

F I G. 1 8
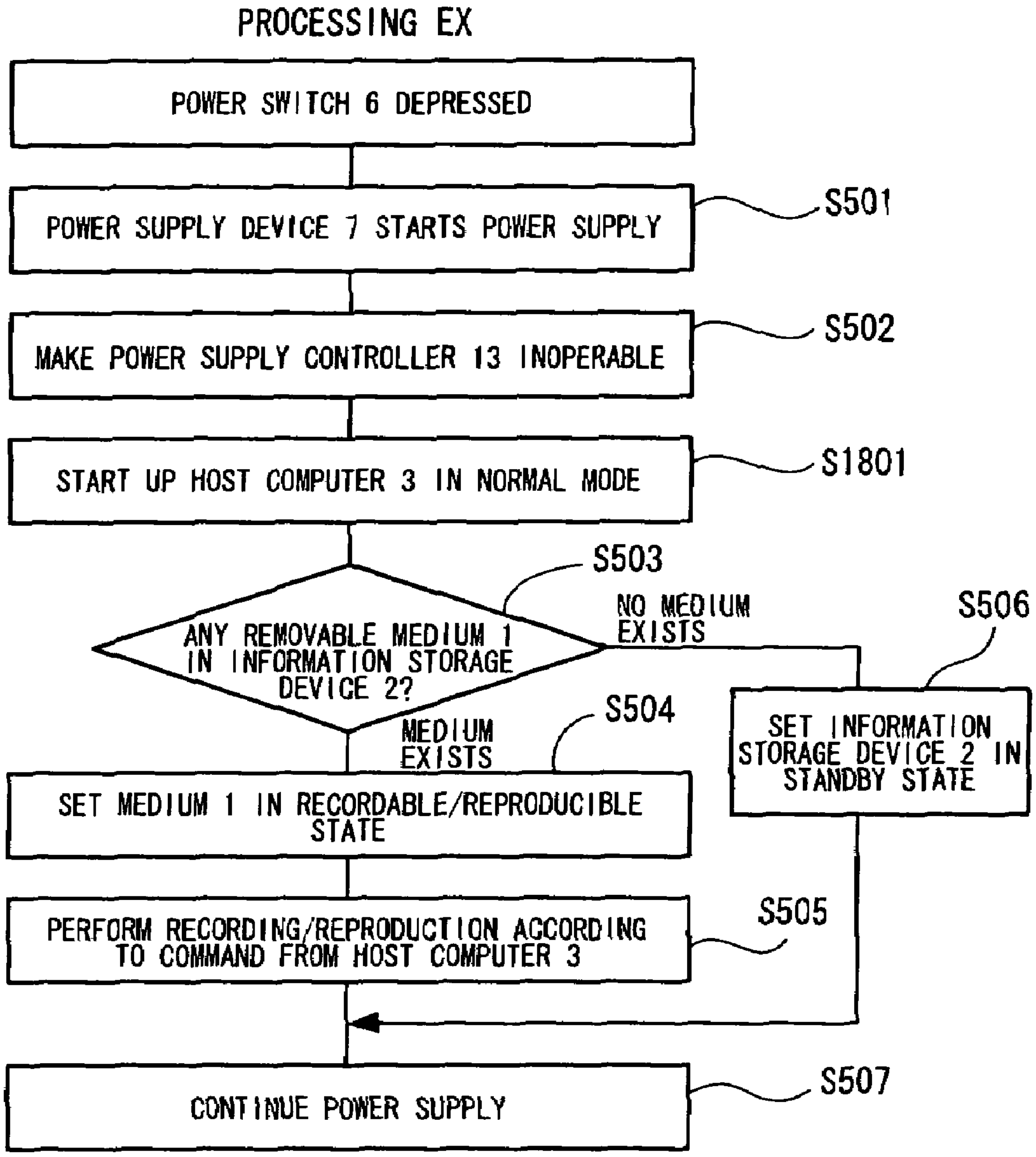

INFORMATION PROCESSING APPARATUS AND POWER SUPPLY CONTROL METHOD FOR INFORMATION PROCESSING APPARATUS

CLAIM OF PRIORITY

This application claims priority under 35 USC 371 to International Application No. PCT/JP2005/000127, filed on Jan. 7, 2005, which claims priority to Japanese Patent Application No. 2004-003552, filed on Jan. 9, 2004, each of which is incorporated by reference in its entirety.

TECHNICAL FIELD

The present invention relates to an information processing apparatus and to a power supply control method for the information processing apparatus. More particularly, the present invention relates to an information processing apparatus and to a power supply control method for the information processing apparatus capable of a loading/ejection operation to load/eject a removable medium provided in an information storage device and capable of controlling supply of power to the information storage device.

BACKGROUND ART

An information storage device, e.g., a CD-ROM drive or the like capable of replacing a disk-type information storage medium (hereinafter referred to simply as “disk” as occasion demands) has been generally used in information processing apparatuses such as personal computers.

Conventional disk replacement methods for information storage devices are roughly divided into two kinds. The first one is a mechanical method in which a user mechanically operates a lid or a drawer-type tray so as to draw out/receive a disk, or expels/takes in a bare disk or a protective case containing a disk, thus performing ejection or loading for replacement of the disk. In the second method, a drawing out/receiving operation on a lid or a drawer-type tray or expelling/taking-in of a bare disk or a protective case containing a disk is electronically performed by operating a switch or the like to perform ejection or loading for replacement of the disk.

With the increase in the disk rotation speed, there has been increasing use of electronic ejection methods of ejecting a disk after stopping the rotation of the disk in most cases of currently-used high-speed CD-ROM drives or the like in particular, in order to decrease the possibility of accidental ejection during disk rotation. Electronic ejection methods enable ejection from or loading into an information storage device when power is supplied to the information storage device but entail a drawback of the impossibility of ejection and loading during power-off.

An information processing apparatus proposed in JP-A-11-149689 has a depression detection device which detects depression of an ejection button or a loading button during power-down of a storage device, a device which supplies power to the storage device by turning on a power supply circuit in response to a button depression detection signal from the depression detection device to operate a loading mechanism, and an expelling/taking-in completion detection device which detects expelling or taking-in of a disk in the storage device in the power-down state and outputs a disk position detection signal. The power supply circuit is turned off after detecting the disk position detection signal. Therefore disk replacement can be reliably performed during power-down of the storage device. The power supply can be completely cut when disk replacement is unnecessary.

DISCLOSURE OF THE INVENTION

Problems to be Solved by the Invention

The art described in JP-A-11-149689 ensures a reduced power consumption but only uses the method of performing loading/ejection into or from the information storage device by detecting depression of one ejection switch. In actual drives, operations other than a loading/ejection operation by actuation of an ejection switch are performed. For example, in a slot loading type of information storage device, an ejection operation is performed by actuation of an ejection switch and a loading operation is started in response to a change in state of a switch, a sensor or the like which detects the state of a medium inserted in the information storage device. In a tray system generally used as a loading system for optical disk recording/reproduction devices, there is a need to detect changes in logic of a plurality of switches and perform corresponding operations as well as to perform a loading/ejection operation by actuation of an ejection switch. For example, an expelled tray is pushed into the device, the state of a switch provided in the device is thereby changed, and a loading operation is performed in response to the change in the state of the switch. The art described in JP-A-11-149689 cannot be adapted to different logics of a plurality of switches.

The apparatus described in JP-A-11-149689 has a detection device for detecting the completion of loading/ejection of a disk during power-down of the device and again turning off the power supply circuit. However, a power supply is used in common for this circuit and the entire information processing apparatus. Therefore, if the time from the moment at which the switch is depressed to the moment at which the switch is released is short, there is a possibility of the switch being released from the depressed state before the power supply for the detection device is turned on. There is, therefore, a problem that failure to discriminate depression of a power switch for the information processing apparatus main unit and depression of the loading/ejection switch of the information storage device from each other may occur.

It is, therefore, an object of the present invention to start power supply by a change in logical state of a switch in an information processing apparatus, operate a loading/ejection mechanism according to the state of the switch, and automatically stop/continue power supply according to the state.

Means for Solving the Problems

To achieve the above-described object, according to the present invention, there is provided an information processing apparatus including an information storage device in which a loading/ejection mechanism for a removable medium is operated according to a change in a depressed state of a switch, a control device which records data on the removable medium and/or reads out data from the removable medium by controlling the information storage device, a power supply device capable of performing and stopping power supply to the information storage device and to the control device, a continuous power supply device capable of supplying power even when power supply by the power supply device is stopped, and a power supply controller which operates by being supplied with power from the continuous power supply device, and which, when the depressed state of the switch is changed during stoppage of power supply from the power supply device to the information storage device, controls the information storage device so that the removable medium loading/ejection mechanism is operated, by controlling the power supply device so that the power supply device supplies power to the information storage device or to the information storage device and the control device.

According to this arrangement, power is supplied only to the power supply controller when power supply to the information storage device and the control device is stopped. Therefore, the power consumption can be minimized when power supply to the entire apparatus is stopped. Also, the loading/ejection operation can be suitably performed according to the logical state of the switch by starting power supply upon detection of the change in the depressed state of the switch.

In the information processing apparatus of the present invention, the power supply controller also performs such control that in the case of ejecting the removable medium by controlling the information storage device so that the loading/ejection mechanism is operated, the power supply controller stops power supply from the power supply device after the completion of the ejection operation, and that, in the case of loading the removable medium by controlling the information storage device so that the loading/ejection mechanism is operated, the power supply controller does not stop power supply from the power supply device even after the completion of the loading operation.

According to this arrangement, the power supply device is controlled according to the performed loading/ejection operation to stop power supply to the apparatus after ejection and to continue power supply to the apparatus at the time of loading. Therefore, the consumption of unnecessary power after ejection is avoided. Also, by medium insertion, the information processing apparatus can automatically perform processing according to the contents of the medium after loading.

In the information processing apparatus of the present invention, the power supply controller also performs such control that when the removable medium is ejected upon the change in the depressed state of the switch during stoppage of power supply to the information storage device, the power supply controller controls the power supply device to supply power to the information storage device, that, when the removable medium is loaded upon the change in the depressed state of the switch during stoppage of power supply to the information storage device, the power supply controller controls the power supply device to supply power to the information storage device and to the control device, that, in the case of ejecting the removable medium, the power supply controller controls the power supply device to stop power supply to the information storage device after the completion of the ejection operation, and that, in the case of loading the removable medium, the power supply controller does not stop power supply from the power supply device even after the completion of the loading operation.

According to this arrangement, the power supply device is controlled according to the performed loading/ejection operation to supply power only to the information storage device at the time of ejection and to stop power supply after the ejection operation. At the time of loading, power is supplied to the entire apparatus to perform the loading operation and power supply is not stopped after the loading operation. Therefore, the power consumption at the time of ejection is minimized while after loading by medium insertion the information processing apparatus can automatically perform processing according to the contents of the medium.

According to the present invention, there is also provided an information processing apparatus including an information storage device in which a loading/ejection mechanism for a removable medium is operated according to a change in a depressed state of a switch, a control device which records data on the removable medium and/or reads out data from the removable medium by controlling the information storage device, a power supply device capable of performing and stopping power supply to the information storage device and to the control device, a continuous power supply device capable of supplying power even when power supply by the power supply device is stopped, a power switch with which power supply to the power supply device is started and stopped, and with which, at the time of starting power supply, the control device is started up in a normal startup mode in which general-purpose processing can be performed by a user program executed on an OS, and a power supply controller which operates by being supplied with power from the continuous power supply device, and which, when the depressed state of the switch provided on an outer portion or an inner portion of the information storage device is changed during stoppage of power supply from the power supply device to the information storage device, controls the power supply device so that the power supply device supplies power to the information storage device or to the information storage device and the control device, thereafter starts up the control device in an instant startup mode for reproducing or processing data in a predetermined format recorded on the removable medium, and controls the information storage device so that the removable medium loading/ejection mechanism is operated according to the change in the depressed state of the switch.

According to this arrangement, power is supplied only to the power supply controller when power supply to the information storage device and the control device is stopped. Therefore, the power consumption can be minimized when power supply to the entire apparatus is stopped. Also, power supply is started by detecting the change in depressed state of the switch to drive the control device in the instant mode. Therefore, the operation can be immediately started.

In the information processing apparatus of the present invention, the power supply controller also performs such control at the time of startup in the instant startup mode, that in the case of ejecting the removable medium by controlling the information storage device so that the loading/ejection mechanism is operated, the power supply controller stops power supply from the power supply device after the completion of the ejection operation, that, if the removable medium does not exist in the information storage device, the power supply controller stops power supply from the power supply device, and that, in the case of loading the removable medium by controlling the information storage device so that the loading/ejection mechanism is operated, the power supply controller does not stop power supply from the power supply device even after the completion of the loading operation.

According to this arrangement, the power supply device is controlled according to the performed loading/ejection operation to stop power supply to the apparatus after ejection and to continue power supply to the apparatus at the time of loading. Therefore, the consumption of unnecessary power after ejection is avoided. Also, by medium insertion, the information processing apparatus can automatically perform processing according to the contents of the medium after loading.

In the information processing apparatus of the present invention, the control device also performs such control as to identify the kind of data on the removable medium at the time of startup in the instant startup mode, perform reproduction or processing of the data if the data is recorded in a predetermined format, and stop power supply by controlling the power supply device if no data is recorded in the predetermined format.

According to this arrangement, the data on the removable medium can be correctly reproduced or processed only in the case where the data is recorded in the predetermined format.

In the information processing apparatus of the present invention, the control device also performs such control as to identify the kind of data on the removable medium at the time of startup in the instant startup mode, perform reproduction or processing of the data if the data is recorded in a predetermined format, and restart in the normal startup mode if no data is recorded in the predetermined format.

According to this arrangement, the data on the removable medium can be correctly reproduced or processed only in the case where the data is recorded in the predetermined format.

In the information processing apparatus of the present invention, the data in the predetermined format is data compliant with a moving picture/audio data standard such as DVD-Video, Video CD and CD Audio.

In the information processing apparatus of the present invention, the loading/ejection mechanism for the removable medium ejects the removable medium when operated by depressing a first switch provided on an outer portion of the information storage device. Also, the loading/ejection mechanism for the removable medium loads the removable medium when operated by changing a depressed state of a second switch provided on an inner portion of the information storage device by insertion of the removable medium, thereby enabling readout of data from the removable medium and/or recording of data on the removable medium.

According to this arrangement, ejection of the removable medium and loading of the removable medium enabling readout of data from the removable medium and/or recording of data on the removable medium can be executed with reliability.

In the information processing apparatus of the present invention, a logic holding device is further provided which holds the logical state of the first switch when depression of the first switch is detected during stoppage of power supply from the power supply device to the information storage device, and which cancels the held logical state when the loading/ejection mechanism for the removable medium is operated to load or eject the removable medium. The loading/ejection mechanism for the removable medium performs the loading or ejection operation according to an output from the logic holding device and the logic of the second switch.

According to this arrangement, the logical state of the first switch depressed during stoppage of power supply to the information storage device is held to ensure that the medium expelling operation can be performed even if the user does not maintain the depressed state of the first switch until power supply to the information storage device is started.

In the information processing apparatus of the present invention, the power supply controller also controls the power supply device so that if the second switch is set in the original state as result of the change in the depressed state of the second switch when power is supplied to the information storage device according to the change in the depressed state of the second switch, the power supply device stops supplying power to the information storage device or to the information storage device and the control device to which power has been supplied, without operating the loading/ejection mechanism for the removable medium.

According to this arrangement, power supply is stopped without performing the loading operation if the removable medium has been released from the loaded state after a start of power supply to the information storage device. Therefore, the power consumption of the information processing apparatus can be minimized even in case where the user enables loading of the removable medium during stoppage of power supply to the information storage device and thereafter immediately takes out the removable medium out of the information storage device.

In the information processing apparatus of the present invention, the loading/ejection mechanism for the removable medium may be a removable medium transport device for transporting the removable medium into the information storage device while holding the removable medium. A third switch is provided on an outer portion of the information storage device for the purpose of operating the removable medium transport device, and a fourth switch is provided on an inner portion of the information storage device to detect an ejecting state of the removable medium transport device. The removable medium loading operation is performed when the third switch is depressed while the removable medium transport device is in the state of ejecting the removable medium, or when a depressed state of the fourth switch is changed. Also, the removable medium ejecting operation is performed when the fourth switch is depressed while the removable medium transport device is not in the state of ejecting the removable medium.

According to this arrangement, an information processing apparatus can be provided which is capable of performing power supply by detecting changes in the depressed states of the plurality of switches, and suitably performing the loading/ejection operation according to the logical states of the plurality of switches.

In the information processing apparatus of the present invention, a logic holding device is further provided which, when depression of the third switch is detected during stoppage of power supply from the power supply device to the information storage device, holds the logical state of the third switch depressed, and which cancels the held logical state after the removable medium transport device has been operated. The removable medium transport device performs the loading or ejection operation according to an output from the logic holding device and the logic of the fourth switch.

According to this arrangement, the logical state of the third switch depressed during stoppage of power supply to the information storage device is held to ensure that the medium expelling operation can be performed even if the user does not maintain the depressed state of the third switch until power supply to the information storage device is started.

In the information processing apparatus of the present invention, the power supply controller also controls the power supply device so that if, when the removable medium transport device performs the loading operation while power is being supplied to the information storage device, the absence of the removable medium in the information storage device is detected after the completion of the loading operation, the power supply device stops supplying power to the information storage device or to the information storage device and the control device to which power has been supplied.

According to this arrangement, power supply is stopped if the medium does not exist in the information storage device after medium loading into the device. Therefore, the power consumption of the information processing apparatus can be minimized even in case where the user performs loading of the medium transport device of the information storage device without the medium during stoppage of power supply to the information storage device.

In the information processing apparatus of the present invention, the loading/ejection mechanism for the removable medium may be a removable medium holding device for holding the removable medium. A fifth switch is provided on an outer portion of the information storage device for the purpose of operating the removable medium holding device, and a sixth switch is provided on an inner portion of the information storage device to detect a locked state of the removable medium holding device inside the information storage device. If the locked state of the removable medium holding device is detected by the sixth switch when the fifth switch is depressed, an operation to expel the removable medium holding device out of the information storage device by releasing the removable medium holding device from the locked state is performed. Also, an operation to enable read-out of data from the removable medium and/or recording of data on the removable medium is performed when the change in state of the removable medium holding device from the non-locked state to the locked state is detected by the sixth switch.

According to this arrangement, power supply can be performed by detecting changes in the depressed states of the plurality of switches, and the loading/ejection operation can be suitably performed according to the logical states of the plurality of switches.

In the information processing apparatus of the present invention, a logic holding device is further provided which, when depression of the fifth switch is detected during stoppage of power supply from the power supply device to the information storage device, holds the logical state of the fifth switch depressed, and which cancels the held logical state after the removable medium holding device has been released from the locked state.

According to this arrangement, the logical state of the fifth switch depressed during stoppage of power supply to the information storage device is held to ensure that the medium expelling operation can be performed even if the user does not maintain the depressed state of the fifth switch until power supply to the information storage device is started.

In the information processing apparatus of the present invention, if the absence of the removable medium in the information storage device is detected when the fifth switch is in a state of being released from the depressed state and when the locked state of the removable medium holding device in the information storage device is detected by the sixth switch while power is being supplied to the information storage device, the power supply controller stops power supply to the information storage device or to the information storage device and the control device to which power is being supplied.

According to this arrangement, power supply is stopped if the medium does not exist in the information storage device after medium loading into the device. Therefore, the power consumption of the information processing apparatus can be minimized even in case where the user performs loading of the removal medium holding device of the information storage device without the medium during stoppage of power supply to the information storage device.

According to the present invention, there is provided a power supply control method for an information processing apparatus having an information storage device in which a loading/ejection mechanism for a removable medium is operated according to a change in a depressed state of a switch, a control device for recording data on the removable medium and/or reading out data from the removable medium by controlling the information storage device, a power supply device capable of performing and stopping power supply to the information storage device and to the control device, and a continuous power supply device capable of supplying power even when power supply by the power supply device is stopped, the method including, when the depressed state of the switch is changed during stoppage of power supply from the power supply device to the information storage device, controlling the information storage device so that the removable medium loading/ejection mechanism is operated, by controlling, by means of a power supply controller which operates by being supplied with power from the continuous power supply device, the power supply device so that the power supply device supplies power to the information storage device or to the information storage device and the control device.

According to this arrangement, power is supplied only to the power supply controller when power supply to the information storage device and the control device is stopped. Therefore, the power consumption can be minimized when power supply to the entire apparatus is stopped. Also, the loading/ejection operation can be suitably performed according to the logical state of the switch by starting power supply upon detection of the change in the depressed state of the switch.

In the power supply control method for the information processing apparatus of the present invention, the power supply controller also performs such control that in the case of ejecting the removable medium by controlling the information storage device so that the loading/ejection mechanism is operated, the power supply controller stops power supply from the power supply device after the completion of the ejection operation, and that, in the case of loading the removable medium by controlling the information storage device so that the loading/ejection mechanism is operated, the power supply controller does not stop power supply from the power supply device even after the completion of the loading operation.

According to this arrangement, the power supply device is controlled according to the performed loading/ejection operation to stop power supply to the apparatus after ejection and to continue power supply to the apparatus at the time of loading. Therefore, the consumption of unnecessary power after ejection is avoided. Also, by medium insertion, the information processing apparatus can automatically perform processing according to the contents of the medium after loading.

In the power supply control method for the information processing apparatus of the present invention, the power supply controller also performs such control that when the removable medium is ejected upon the change in the depressed state of the switch during stoppage of power supply to the information storage device, the power supply controller controls the power supply device to supply power to the information storage device, that, when the removable medium is loaded upon the change in the depressed state of the switch during stoppage of power supply to the information storage device, the power supply controller controls the power supply device to supply power to the information storage device and to the control device, that, in the case of ejecting the removable medium, the power supply controller controls the power supply device to stop power supply to the information storage device after the completion of the ejection operation, and that, in the case of loading the removable medium, the power supply controller does not stop power supply from the power supply device even after the completion of loading.

According to this arrangement, the power supply device is controlled according to the performed loading/ejection operation to supply power only to the information storage device at the time of ejection and to stop power supply after the ejection operation. At the time of loading, power is supplied to the entire apparatus to perform the loading operation and power supply is not stopped after the loading operation. Therefore, the power consumption at the time of ejection is minimized while after loading by medium insertion the information processing apparatus can automatically perform processing according to the contents of the medium.

According to the present invention, there is also provided a power supply control method for an information processing apparatus having an information storage device in which a loading/ejection mechanism for a removable medium is operated according to a change in a depressed state of a switch, a control device which records data on the removable medium and/or reads out data from the removable medium by controlling the information storage device, a power supply device capable of performing and stopping power supply to the information storage device and to the control device, a power switch with which start-stop control of power supply to the power supply device is performed, a continuous power supply device capable of supplying power even when power supply by the power supply device is stopped, and a power supply controller which operates by being supplied with power from the continuous power supply device, the method including, in the case of staring power supply from the power supply device by control with the power switch, starting up the control device in a normal startup mode in which general-purpose processing can be performed by a user program executed on an OS; when the depressed state of the switch is changed during stoppage of power supply from the power supply device to the information storage device, controlling by the power supply controller the power supply device so that the power supply device supplies power to the information storage device or to the information storage device and the control device, and starting up the control device in an instant startup mode for reproducing or processing data in a predetermined format recorded on the removable medium; and controlling the information storage device under a command from the power supply controller so that the removable medium loading/ejection mechanism is operated according to the depressed state of the switch.

According to this arrangement, power is supplied only to the power supply controller when power supply to the information storage device and the control device is stopped. Therefore, the power consumption can be minimized when power supply to the entire apparatus is stopped. Also, power supply is started by detecting the change in depressed state of the switch to drive the control device in the instant mode. Therefore, the operation can be immediately started.

In the power supply control method for the information processing apparatus of the present invention, the power supply controller also performs such control at the time of startup in the instant startup mode, that in the case of ejecting the removable medium by controlling the information storage device so that the loading/ejection mechanism is operated, the power supply controller stops power supply from the power supply device after the completion of the ejection operation, that, if the removable medium does not exist in the information storage device, the power supply controller stops power supply from the power supply device, and that, in the case of loading the removable medium by controlling the information storage device so that the loading/ejection mechanism is operated, the power supply controller continues power supply from the power supply device even after the completion of the loading operation.

According to this arrangement, the power supply device is controlled according to the performed loading/ejection operation to stop power supply to the apparatus after ejection and to continue power supply to the apparatus at the time of loading. Therefore, the consumption of unnecessary power after ejection is avoided. Also, by medium insertion, the information processing apparatus can automatically perform processing according to the contents of the medium after loading.

In the power supply control method for the information processing apparatus of the present invention, the control device also controls the information storage device to identify the kind of data on the removable medium at the time of startup in the instant startup mode, perform reproduction or processing of the data if the data is recorded in a predetermined format, and stop power supply by controlling the power supply device if no data is recorded in the predetermined format.

According to this arrangement, the data on the removable medium can be correctly reproduced or processed only in the case where the data is recorded in the predetermined format.

In the power supply control method for the information processing apparatus of the present invention, the control device also controls the information storage device to identify the kind of data on the removable medium at the time of startup in the instant startup mode, perform reproduction or processing of the data if the data is recorded in a predetermined format, and restart in the normal startup mode if no data is recorded in the predetermined format.

According to this arrangement, the data on the removable medium can be correctly reproduced or processed only in the case where the data is recorded in the predetermined format.

In the power supply control method for the information processing apparatus of the present invention, the data in the predetermined format is data compliant with a moving picture/audio data standard such as DVD-Video, Video CD and CD Audio.

In the power supply control method for the information processing apparatus of the present invention, the loading/ejection mechanism for the removable medium ejects the removable medium when operated by depressing a first switch provided on an outer portion of the information storage device, and the loading/ejection mechanism for the removable medium loads the removable medium when operated by changing a depressed state of a second switch provided on an inner portion of the information storage device by insertion of the removable medium.

According to this arrangement, ejection of the removable medium and loading of the removable medium enabling readout of data from the removable medium and/or recording of data on the removable medium can be executed with reliability.

In the power supply control method for the information processing apparatus of the present invention, the logical state of the first switch is held when depression of the first switch is detected during stoppage of power supply from the power supply device to the information storage device, and the held logical state is canceled when the loading/ejection mechanism for the removable medium is operated to load or eject the removable medium. The loading/ejection mechanism for the removable medium is made to perform the loading or ejection operation according to the logical state and the logic of the second switch.

According to this arrangement, the logical state of the first switch depressed during stoppage of power supply to the information storage device is held to ensure that the medium expelling operation can be performed even if the user does not maintain the depressed state of the first switch until power supply to the information storage device is started.

In the power supply control method for the information processing apparatus of the present invention, the power supply controller also controls the power supply device so that if the second switch is set in the original state as result of the change in the depressed state of the second switch when power is supplied to the information storage device according to the change in the depressed state of the second switch, the power supply device stops supplying power to the information storage device or to the information storage device and the control device to which power has been supplied, without operating the loading/ejection mechanism for the removable medium.

According to this arrangement, power supply is stopped without performing the loading operation if the removable medium has been released from the loaded state after a start of power supply to the information storage device. Therefore, the power consumption of the information processing apparatus can be minimized even in case where the user enables loading of the removable medium during stoppage of power supply to the information storage device and thereafter immediately takes out the removable medium out of the information storage device.

In the power supply control method for the information processing apparatus of the present invention, a removable medium transport device for transporting the removable medium into the information storage device while holding the removable medium is used as the loading/ejection mechanism for the removable medium. A third switch provided on an outer portion of the information storage device for the purpose of operating the removable medium transport device is used. A fourth switch provided on an inner portion of the information storage device to detect an ejecting state of the removable medium transport device is also used. The removable medium loading operation is performed when the third switch is depressed while the removable medium transport device is in the state of ejecting the removable medium, or when a depressed state of the fourth switch is changed. The removable medium ejecting operation is performed when the fourth switch is depressed while the removable medium transport device is not in the state of ejecting the removable medium.

According to this arrangement, the power supply control method for the information processing apparatus can be provided which ensures that power supply can be performed by detecting changes in the depressed states of the plurality of switches, and that the loading/ejection operation can be suitably performed according to the logical states of the plurality of switches.

In the power supply control method for the information processing apparatus of the present invention, the logical state of the third switch depressed is held when depression of a third switch is detected during stoppage of power supply from the power supply device to the information storage device. The held logical state is canceled after the removable medium transport device has been operated.

According to this arrangement, the logical state of the third switch depressed during stoppage of power supply to the information storage device is held to ensure that the medium expelling operation can be performed even if the user does not maintain the depressed state of the third switch until power supply to the information storage device is started.

In the power supply control method for the information processing apparatus of the present invention, the power supply controller also controls the power supply device so that if, when the removable medium transport device performs the loading operation while power is being supplied to the information storage device, the absence of the removable medium in the information storage device is detected after the completion of the loading operation, the power supply device stops supplying power to the information storage device or to the information storage device and the control device to which power has been supplied.

According to this arrangement, power supply is stopped if the medium does not exist in the information storage device after medium loading into the device. Therefore, the power consumption of the information processing apparatus can be minimized even in case where the user performs loading of the medium transport device of the information storage device without the medium during stoppage of power supply to the information storage device.

In the power supply control method for the information processing apparatus of the present invention, a removable medium holding device for holding the removable medium is used as the loading/ejection mechanism for the removable medium. A fifth switch provided on an outer portion of the information storage device for the purpose of operating the removable medium holding device is used. A sixth switch provided on an inner portion of the information storage device to detect a locked state of the removable medium holding device inside the information storage device is also used. If the locked state of the removable medium holding device is detected by the sixth switch when the fifth switch is depressed, the removable medium holding device is expelled out of the information storage device by releasing the removable medium holding device from the locked state. Readout of data from the removable medium and/or recording of data on the removable medium is enabled when the change in state of the removable medium holding device from the non-locked state to the locked state is detected by the sixth switch.

According to this arrangement, power supply can be performed by detecting changes in the depressed states of the plurality of switches, and the loading/ejection operation can be suitably performed according to the logical states of the plurality of switches.

In the power supply control method for the information processing apparatus of the present invention, the logical state of the fifth switch depressed is held when depression of a fifth switch is detected during stoppage of power supply from the power supply device to the information storage device. The held logical state is cancelled after the removable medium holding device has been released from the locked state.

According to this arrangement, the logical state of the fifth switch depressed during stoppage of power supply to the information storage device is held to ensure that the medium expelling operation can be performed even if the user does not maintain the depressed state of the fifth switch until power supply to the information storage device is started.

In the power supply control method for the information processing apparatus of the present invention, if the absence of the removable medium in the information storage device is detected when the locked state of the removable medium holding device in the information storage device is detected by the sixth switch while power is being supplied to the information storage device, the power supply controller stops power supply to the information storage device or to the information storage device and the control device to which power is being supplied.

According to this arrangement, power supply is stopped if the medium does not exist in the information storage device after medium loading into the device. Therefore, the power consumption of the information processing apparatus can be minimized even in case where the user performs loading of the removal medium holding device of the information storage device without the medium during stoppage of power supply to the information storage device.

According to the present invention, there is also provided an information storage device in which a loading/ejection mechanism for a removable medium is operated according to a change in a depressed state of a switch. The information storage device is controlled by a control device so as to record data on the removable medium and/or read out data from the removable medium. The information storage device is connected to a power supply device capable of performing and stopping power supply to the information storage device and to the control device. The information storage device has a power supply controller which operates by being supplied with power from a continuous power supply device capable of supplying power when power supply by the power supply device is stopped, and which, when the depressed state of the switch is changed during stoppage of power supply from the power supply device to the information storage device, controls the information storage device so that the removable medium loading/ejection mechanism is operated, by controlling the power supply device so that the power supply device supplies power to the information storage device or to the information storage device and the control device.

According to this arrangement, power is supplied only to the power supply controller when power supply to the information storage device and the control device is stopped. Therefore, the power consumption can be minimized when power supply to the entire apparatus is stopped. Also, the loading/ejection operation can be suitably performed according to the logical state of the switch by starting power supply upon detection of the change in the depressed state of the switch.

In the information storage device of the present invention, the power supply controller performs such control that in the case of ejecting the removable medium by controlling the information storage device so that the loading/ejection mechanism is operated, the power supply controller stops power supply from the power supply device after the completion of the ejection operation, and that, in the case of loading the removable medium by controlling the information storage device so that the loading/ejection mechanism is operated, the power supply controller does not stop power supply from the power supply device even after the completion of the loading operation.

According to this arrangement, the power supply device is controlled according to the performed loading/ejection operation to stop power supply to the apparatus after ejection and to continue power supply to the apparatus at the time of loading. Therefore, the consumption of unnecessary power after ejection is avoided. Also, by medium insertion, the information processing apparatus can automatically perform processing according to the contents of the medium after loading.

In the information storage device of the present invention, the power supply controller performs such control that when the removable medium is ejected upon the change in the depressed state of the switch during stoppage of power supply to the information storage device, the power supply controller controls the power supply device to supply power to the information storage device, that, when the removable medium is loaded upon the change in the depressed state of the switch during stoppage of power supply to the information storage device, the power supply controller controls the power supply device to supply power to the information storage device and to the control device, that, in the case of ejecting the removable medium, the power supply controller controls the power supply device to stop power supply to the information storage device after the completion of the ejection operation, and that, in the case of loading the removable medium, the power supply controller does not stop power supply from the power supply device even after the completion of the loading operation.

According to this arrangement, the power supply device is controlled according to the performed loading/ejection operation to supply power only to the information storage device at the time of ejection and to stop power supply after the ejection operation. At the time of loading, power is supplied to the entire apparatus to perform the loading operation and power supply is not stopped after the loading operation. Therefore, the power consumption at the time of ejection is minimized while after loading by medium insertion the information processing apparatus can automatically perform processing according to the contents of the medium.

According to the present invention, there is also provided an information storage device in which a loading/ejection mechanism for a removable medium is operated according to a change in a depressed state of a switch. The information storage device is controlled by a control device so as to record data on the removable medium and/or read out data from the removable medium. The information storage device is connected to a power supply device capable of performing and stopping power supply to the information storage device and to the control device. Power supply to the power supply device is started and stopped by a power switch. The control device is started up in a normal startup mode in which general-purpose processing can be performed by a user program executed on an OS. The information storage device includes a power supply controller which operates by being supplied with power from a continuous power supply device capable of supplying power when power supply by the power supply device is stopped, and which, when the depressed state of a switch provided on an outer portion or an inner portion of the information storage device is changed during stoppage of power supply from the power supply device to the information storage device, controls the power supply device so that the power supply device supplies power to the information storage device or to the information storage device and the control device, thereafter starts up the control device in an instant startup mode for reproducing or processing data in a predetermined format recorded on the removable medium, and controls the information storage device so that the removable medium loading/ejection mechanism is operated according to the change in the depressed state of the switch.

According to this arrangement, power is supplied only to the power supply controller when power supply to the information storage device and the control device is stopped. Therefore, the power consumption can be minimized when power supply to the entire apparatus is stopped. Also, power supply is started by detecting the change in depressed state of the switch to drive the control device in the instant mode. Therefore, the operation can be immediately started.

In the information storage device of the present invention, the power supply controller performs such control at the time of startup in the instant startup mode, that in the case of ejecting the removable medium by controlling the information storage device so that the loading/ejection mechanism is operated, the power supply controller stops power supply from the power supply device after the completion of the ejection operation, that, if the removable medium does not exist in the information storage device, the power supply controller stops power supply from the power supply device, and that, in the case of loading the removable medium by controlling the information storage device so that the loading/ejection mechanism is operated, the power supply controller does not stop power supply from the power supply device even after the completion of the loading operation.

According to this arrangement, the power supply device is controlled according to the performed loading/ejection operation to stop power supply to the apparatus after ejection and to continue power supply to the apparatus at the time of loading. Therefore, the consumption of unnecessary power after ejection is avoided. Also, by medium insertion, the information processing apparatus can automatically perform processing according to the contents of the medium after loading.

In the information storage device of the present invention, the power supply controller performs such control as to identify the kind of data on the removable medium at the time of startup in the instant startup mode, perform reproduction or processing of the data if the data is recorded in a predetermined format, and stop power supply by controlling the power supply device if no data is recorded in the predetermined format.

According to this arrangement, the data on the removable medium can be correctly reproduced or processed only in the case where the data is recorded in the predetermined format.

In the information storage device of the present invention, the power supply controller performs such control as to identify the kind of data on the removable medium at the time of startup in the instant startup mode, perform reproduction or processing of the data if the data is recorded in a predetermined format, and restart in the normal startup mode if no data is recorded in the predetermined format.

According to this arrangement, the data on the removable medium can be correctly reproduced or processed only in the case where the data is recorded in the predetermined format.

In the information storage device of the present invention, the data in the predetermined format is data compliant with a moving picture/audio data standard such as DVD-Video, Video CD and CD Audio.

In the information storage device of the present invention, the loading/ejection mechanism for the removable medium ejects the removable medium when operated by depressing a first switch provided on an outer portion of the information storage device. The loading/ejection mechanism for the removable medium loads the removable medium when operated by changing a depressed state of a second switch provided on an inner portion of the information storage device by insertion of the removable medium, thereby enabling readout of data from the removable medium and/or recording of data on the removable medium.

According to this arrangement, ejection of the removal medium and loading the removal medium to enable readout of data from the removal medium and/or recording of data on the removal medium can be performed with reliability.

In the information storage device of the present invention, a logic holding device is further provided which holds the logical state of the first switch when depression of the first switch is detected during stoppage of power supply from the power supply device to the information storage device, and which cancels the held logical state when the loading/ejection mechanism for the removable medium is operated to load or eject the removable medium. The loading/ejection mechanism for the removable medium performs the loading or ejection operation according to an output from the logic holding device and the logic of the second switch.

According to this arrangement, the logical state of the first switch depressed during stoppage of power supply to the information storage device is held to ensure that the medium expelling operation can be performed even if the user does not maintain the depressed state of the first switch until power supply to the information storage device is started.

In the information storage device of the present invention, the power supply controller controls the power supply device so that if the second switch is set in the original state as result of the change in the depressed state of the second switch when power is supplied to the information storage device according to the change in the depressed state of the second switch, the power supply device stops supplying power to the information storage device or to the information storage device and the control device to which power has been supplied, without operating the loading/ejection mechanism for the removable medium.

According to this arrangement, power supply is stopped without performing the loading operation if the removable medium has been released from the loaded state after a start of power supply to the information storage device. Therefore, the power consumption of the information processing apparatus can be minimized even in case where the user enables loading of the removable medium during stoppage of power supply to the information storage device and thereafter immediately takes out the removable medium out of the information storage device.

In the information storage device of the present invention, the loading/ejection mechanism for the removable medium is a removable medium transport device for transporting the removable medium into the information storage device while holding the removable medium. A third switch is provided on an outer portion of the information storage device for the purpose of operating the removable medium transport device, and a fourth switch is provided on an inner portion of the information storage device to detect an ejecting state of the removable medium transport device. The removable medium loading operation is performed when the third switch is depressed while the removable medium transport device is in the state of ejecting the removable medium, or when a depressed state of the fourth switch is changed. The removable medium ejecting operation is performed when the fourth switch is depressed while the removable medium transport device is not in the state of ejecting the removable medium.

According to this arrangement, an information processing apparatus can be provided which is capable of performing power supply by detecting changes in the depressed states of the plurality of switches, and suitably performing the loading/ejection operation according to the logical states of the plurality of switches.

In the information storage device of the present invention, a logic holding device is further provided which, when depression of the third switch is detected during stoppage of power supply from the power supply device to the information storage device, holds the logical state of the third switch depressed, and which cancels the held logical state after the removable medium transport device has been operated. The removable medium transport device performs the loading or ejection operation according to an output from the logic holding device and the logic of the fourth switch.

According to this arrangement, the logical state of the third switch depressed during stoppage of power supply to the information storage device is held to ensure that the medium expelling operation can be performed even if the user does not maintain the depressed state of the third switch until power supply to the information storage device is started.

In the information storage device of the present invention, the power supply controller controls the power supply device so that if, when the removable medium transport device performs the loading operation while power is being supplied to the information storage device, the absence of the removable medium in the information storage device is detected after the completion of the loading operation, the power supply device stops supplying power to the information storage device or to the information storage device and the control device to which power has been supplied.

According to this arrangement, power supply is stopped if the medium does not exist in the information storage device after medium loading into the device. Therefore, the power consumption of the information processing apparatus can be minimized even in case where the user performs loading of the medium transport device of the information storage device without the medium during stoppage of power to the information storage device.

In the information storage device of the present invention, the loading/ejection mechanism for the removable medium is a removable medium holding device for holding the removable medium. A fifth switch is provided on an outer portion of the information storage device for the purpose of operating the removable medium holding device, and a sixth switch is provided on an inner portion of the information storage device to detect a locked state of the removable medium holding device inside the information storage device. If the locked state of the removable medium holding device is detected by the sixth switch when the fifth switch is depressed, an operation to expel the removable medium holding device out of the information storage device by releasing the removable medium holding device from the locked state is performed. Also, an operation to enable readout of data from the removable medium and/or recording of data on the removable medium is performed when the change in state of the removable medium holding device from the non-locked state to the locked state is detected by the sixth switch.

According to this arrangement, power supply can be performed by detecting changes in the depressed states of the plurality of switches, and the loading/ejection operation can be suitably performed according to the logical states of the plurality of switches.

In the information storage device of the present invention, a logic holding device is further provided which, when depression of the fifth switch is detected during stoppage of power supply from the power supply device to the information storage device, holds the logical state of the fifth switch depressed, and which cancels the held logical state after the removable medium holding device has been released from the locked state.

According to this arrangement, the logical state of the fifth switch depressed during stoppage of power supply to the information storage device is held to ensure that the medium expelling operation can be performed even if the user does not maintain the depressed state of the fifth switch until power supply to the information storage device is started.

In the information storage device of the present invention, if the absence of the removable medium in the information storage device is detected when the fifth switch is in a state of being released from the depressed state and when the locked state of the removable medium holding device in the information storage device is detected by the sixth switch while power is being supplied to the information storage device, the power supply controller stops power supply to the information storage device or to the information storage device and the control device to which power is being supplied.

According to this arrangement, power supply is stopped if the medium does not exist in the information storage device after medium loading into the device. Therefore, the power consumption of the information processing apparatus can be minimized even in case where the user performs loading of the removal medium holding device of the information storage device without the medium during stoppage of power supply to the information storage device.

The information processing apparatus of the present invention has an information storage device in which a loading/ejection mechanism for a removable medium is operated according to a change in a depressed state of a switch, a control device which records data on the removable medium and/or reads out data from the removable medium by controlling the information storage device, a power supply device capable of performing and stopping power supply to the information storage device and to the control device, a continuous power supply device capable of supplying power when power supply by the power supply device is stopped, and a power supply controller which operates by being supplied with power from the continuous power supply device, and which, when the depressed state of the switch is changed during stoppage of power supply from the power supply device to the information storage device, controls the information storage device so that the removable medium loading/ejection mechanism is operated, by controlling the power supply device so that the power supply device supplies power to the information storage device or to the information storage device and the control device. Also, according to the power supply control method for the information processing apparatus of the present invention, the information storage device in which a loading/ejection mechanism for a removable medium is operated according to a change in a depressed state of a switch, a control device which records data on the removable medium and/or reads out data from the removable medium by controlling the information storage device, a power supply device capable of performing and stopping power supply to the information storage device and to the control device, and a continuous power supply device capable of supplying power when power supply by the power supply device is stopped is controlled as described below. When the depressed state of the switch is changed during stoppage of power supply from the power supply device to the information storage device, the power supply device is controlled by the power supply controller operated so as to supply power to the information storage device or to the information storage device and the control device by the power supply controller operated by being supplied with power from the continuous power supply device, thereby the information storage device being controlled so that the removable medium loading/ejection mechanism is operated. Accordingly, power is supplied only to the power supply controller during stoppage of power supply to the information processing apparatus and the control device. Thus, the power consumption when power supply to the entire apparatus is stopped can be minimized, and the loading/ejection operation can be suitably performed according to the logical state of the switch by starting power supply upon detection of the change in the depressed state of the switch.

BRIEF DESCRIPTION OF THE DRAWINGS

FIG. 1 is a block diagram of an information processing apparatus in Embodiment 1 of the present invention in which the present invention is applied to a slot-in type of CD-R/RW recording/reproduction apparatus;

FIG. 5A is a flowchart showing another flow of medium loading/ejection processing in the apparatus shown in FIG. 1;

FIG. 5B is a flowchart showing another flow of medium loading/ejection processing in the apparatus shown in FIG. 1;

FIG. 6 is a block diagram of an information processing apparatus in Embodiment 2 of the present invention in which the present invention is applied to a tray loading type of CD-R/RW recording/reproduction apparatus;

FIG. 7 is a perspective view or an external appearance when a removable medium is inserted in the tray loading type of CD-R/RW recording/reproduction apparatus shown in FIG. 6;

FIG. 9A is a flowchart showing another flow of medium loading/ejection processing in the apparatus shown in FIG. 6;

FIG. 9B is a flowchart showing another flow of medium loading/ejection processing in the apparatus shown in FIG. 6;

FIG. 17 is a flowchart showing a flow of medium loading/ejection processing in the apparatus shown in FIG. 16; and FIG. 18 is a flowchart showing another flow of medium loading/ejection processing in the apparatus shown in FIG. 16.

DETAILED DESCRIPTION OF THE INVENTION

An information processing apparatus and a power supply control method for the information processing apparatus according to embodiments of the present invention will be described below in detail with reference to the drawings.

Embodiment 1

Embodiment 1 of the present invention will be described below with reference to FIGS. 1, 2, 3A, 3B, 4A, 4B, 5A, and 5B.

Figure 2:
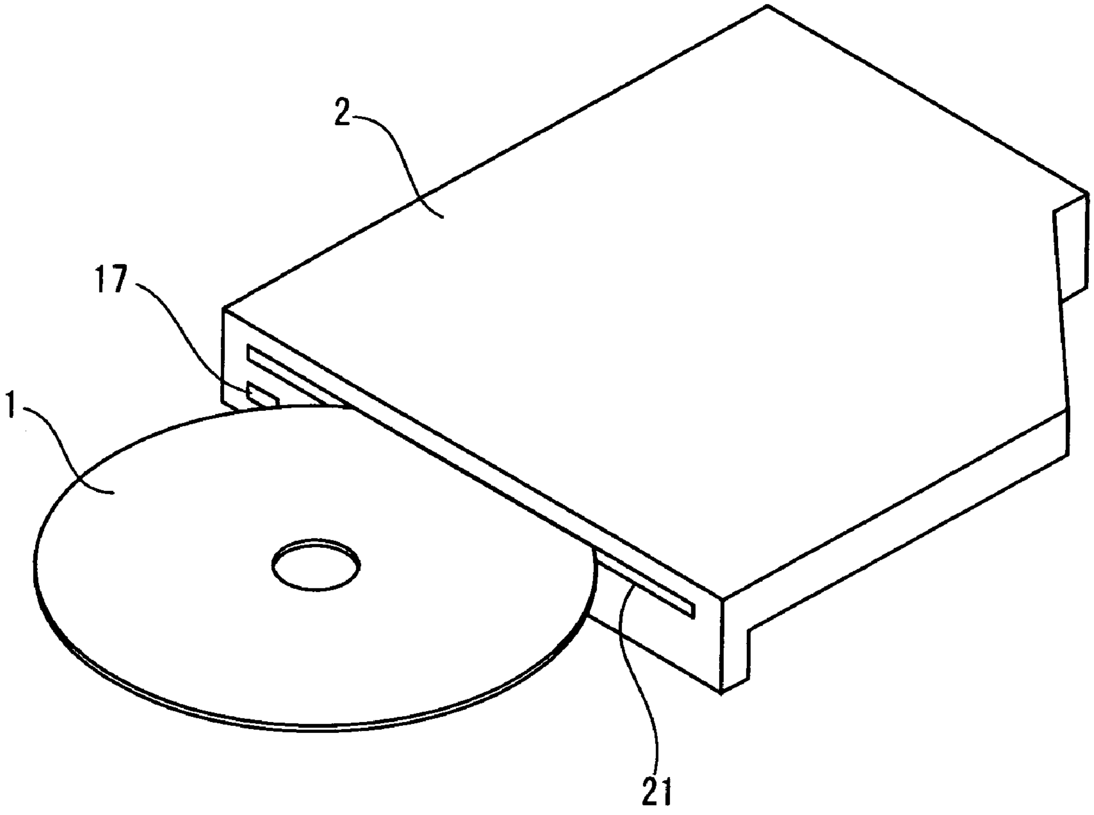
FIG. 2 is a perspective view or an external appearance when a removable medium is inserted in the slot-in type of CD-R/RW recording/reproduction apparatus shown in FIG. 1.

FIG. 1 is a block diagram of a configuration in case where the information processing apparatus of the present invention is applied to a slot-in type of CD-R/RW recording/reproduction apparatus. Reference numeral 1 denotes a removable medium, e.g., a CD-ROM/R/RW, a DVD-ROM/R/RW, a DVD-RAM, a DVD-RAM in a cartridge, or a semiconductor memory medium. This embodiment will be described with respect to a case where the removable medium is a CD-R/RW disk. FIG. 2 is a perspective view showing an external appearance when the removable medium is inserted in the slot-in-type CD-R/RW recording/reproduction apparatus. FIGS. 3A, 3B, 4A, 4B, 5A, and 5B are flowcharts each showing the flow of medium loading/ejection processing in the information processing apparatus in this embodiment.

Referring to FIGS. 1 and 2, reference numeral 2 denotes an information storage device into which the removable medium 1 is loaded, and which reproduces data from the removable medium 1 or records data on the removable medium 1. Reference numeral 3 denotes a host computer which is connected to the information storage device 2 by an interface device 4, and which performs operations to supply various operating instructions to the information storage device 2 and receive data reproduced in the information storage device 2 through the interface device 4. Ordinarily, the interface device 4 uses a standardized interface, e.g., ATAPI, SCSI, USB or IEEE1394 for communication between the computer 3 and the information storage device 2. Needless to say, the apparatus can be implemented in the same manner by using a device in conformity with a standard other than these standards as the interface device 4 if the device is capable of data/instruction exchange between the host computer 3 and the information storage device 2.

Reference numeral 5 denotes a power supply unit constituted by a power supply device 7 which is turned on/off by a power switch 6, and a continuous power supply device 8 which, even when the power supply switch 6 is turned off, continuously supplies power as long as power is supplied to the power supply unit 5. The power supply device 7 supplies power to the host computer 3 and to a main power operating section 9 in the information storage device 2. The main power operating section 9 in the information storage device 2 is a section for performing main functions of the information storage device 2. The main power operating section 9 includes a loading/ejection control section 10, a CPU 11, a medium transport device 12 and a removable medium reproduction device not shown in the figures. The continuous power supply device 8 supplies power to a power supply controller 13 in the information storage device 2. The power supply controller 13 controls the supply of power performed by the power supply device 7 and controls turning off of the supply of power. The power supply controller 13 operates by being supplied with the least necessary power necessary for operation thereof from the continuous power supply device 8 even when the supply of power to the host computer 3 and the main power operating section 9 is shut off.

Reference numeral 17 denotes a medium expelling switch and reference numeral 18 a medium insertion detection switch. The medium expelling switch 17 is provided on an outer portion of the information storage device 2, and is depressed by a user to perform a medium expelling operation. The medium insertion detection switch 18 is provided in the device 2 to detect insertion of the removable medium 1 into the information storage device 2. When power is being supplied from the power supply device 7 on the basis of the state of the switch detected or a change in the switch state, the CPU 11 connected to the switch 18 determines the necessary processing and operates the loading/ejection control section 10 to drive the medium transport device 12 and thereby perform a loading/ejection operation. The medium transport device 12 is constituted by rollers for transporting the medium 1 or a combination of a spring and gears for transporting the medium 1 in the slot-loading-type information storage device 2 for example. In the slot-loading-type information storage device 2 of this embodiment, the removable medium 1 is directly inserted into a medium insertion opening 21 of the information storage device 2, as shown in FIG. 2. The removable medium 1 is then transported automatically into the device and set in a recordable/reproducible state. Also, when the removable medium 1 is expelled, it is directly expelled through the medium insertion opening 21.

The actual operation when loading/ejection is performed will next be described in detail.

The operation when power is supplied from the power supply device 7 to the host computer 3 and to the main power operating section 9 will first be described. When the main power operating section 9 is supplied with power, the CPU 11 controls the power supply controller 13 so that the power supply control operation on the power supply device 7 by the power supply controller 13 is not performed. For example, if the depressed state of the medium expelling switch 17 or a change made in the state of the medium insertion detection switch 18 is not set as a power supply starting factor in the power supply controller 13 when supply of power to the main power operating section 9 of the information storage device 2 is started or when the CPU 11 is reset in a hardware reset manner, the arrangement may be such that an output port from the CPU 11 to the power supply controller 13 is prepared and the power supply controller 13 is in a shut down state when the output state from the CPU 11 is H.

Figure 3B:
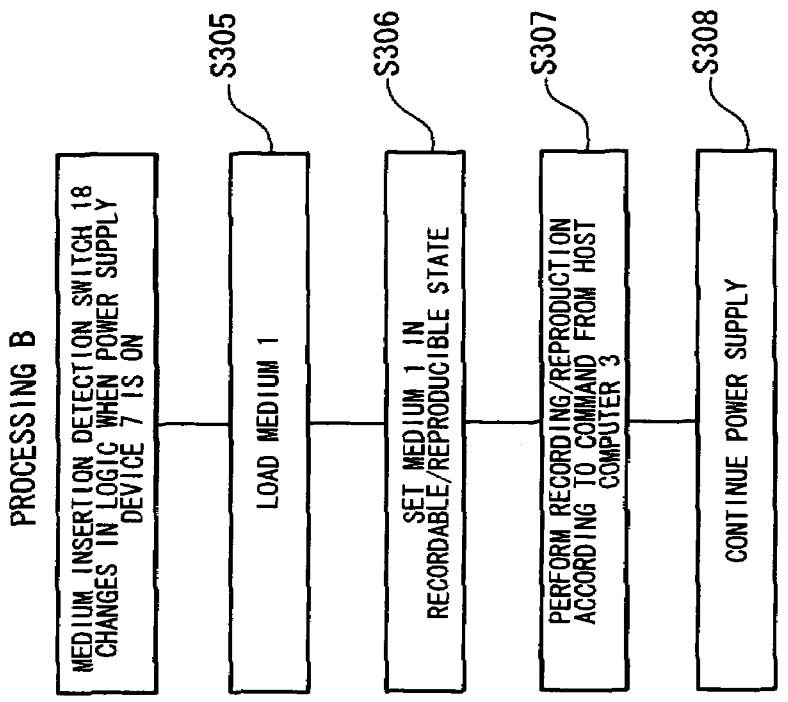
FIG. 3B is a flowchart showing another flow of medium loading/ejection processing in the apparatus shown in FIG. 1.
Figure 3A:
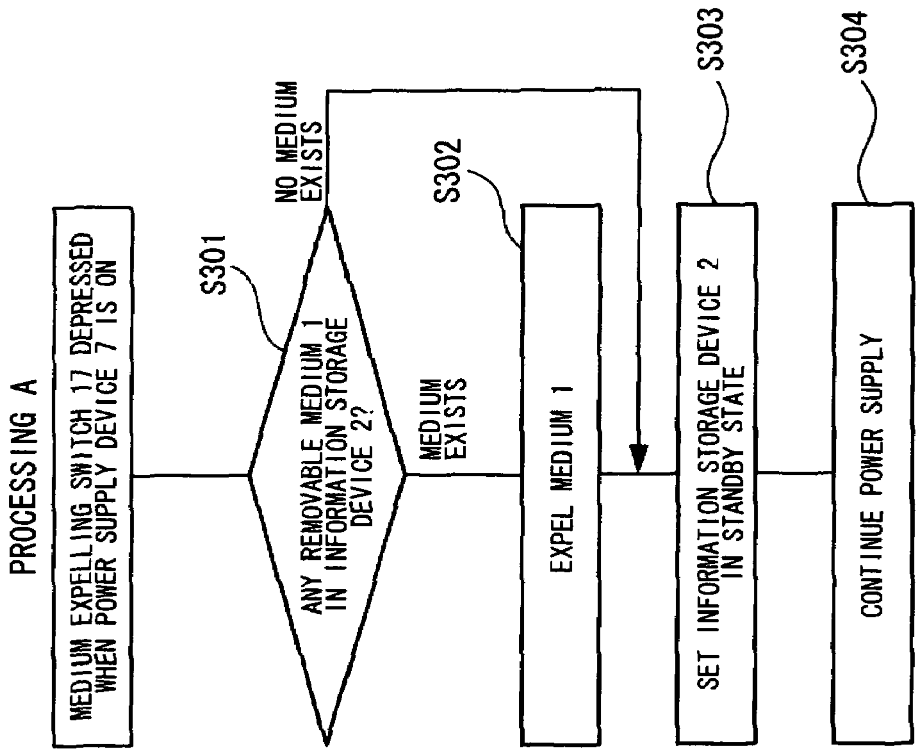
FIG. 3A is a flowchart showing a flow of medium loading/ejection processing in the apparatus shown in FIG. 1.

When the medium expelling switch 17 is depressed in this state, processing A shown in FIG. 3A is executed. In S301, if the CPU 11 determines that the removable medium 1 has been loaded into the information storage device 2, it operates the loading/ejection control section 10 to drive the medium transport device 12 and expel the removable medium 1 out of the information storage device 2 in S302 after detecting the depression of the medium expelling switch 17. Needless to say, if the removable medium 1 is a disk storage medium, and if it is in a rotating state, it is expelled after being stopped from rotating. If the removable medium 1 is a non-disk medium such as a semiconductor memory, it is expelled after necessary processing such as access suspension has been performed.

No operation is performed if the removable medium 1 has not been loaded into the information storage device 2 in the slot-loading-type information storage device of this embodiment.

After the completion of the above-described processing, the information storage device 2 is set in a standby state in S303. The standby state is a state in which, while power is being supplied to the main power operating section 9 of the information storage device 2, the operations of unnecessary circuit blocks in the information storage device 2 are stopped to limit the power consumption to the least necessary level. At this time, since the power supply controller 13 is not operating, power supply from the power supply device 7 is continued in S304.

The operation when the logic of the medium insertion detection switch 18 is changed will next be described. When the removable medium 1 is inserted directly to a certain position from the medium insertion opening 21 in the slot-loading-type information storage device 2 of this embodiment, the medium insertion detection switch 18 detects the insertion of the removable medium 1. The corresponding change in the logic of the medium insertion detection switch 18 varies depending on the mechanical structure. Various cases are conceivable. For example, the medium insertion detection switch 18 may be turned on (or off) at a stage at which the removable medium 1 is inserted to a certain position, and turned off (or on) at a stage at which the removable medium 1 is drawn into the information storage device 2 by a further movement of the medium transport device 12, thus changing the logic. Also, the medium insertion detection switch 18 may be turned on (or off) at a stage at which the removable medium 1 is inserted to a certain position, and maintained in the on (or off) state when the removable medium 1 is thereafter kept in the information storage device 2.

When the CPU 11 detects the change in logical stage of the medium insertion detection switch 18, processing B shown in FIG. 3B is executed. The loading/ejection control section 10 is operated to drive the medium transport device 12 in S305 according to the switch logic change in the medium loading sequence based on the structure of the information storage device 2, thereby drawing the removable medium 1 into the information storage device 2 and setting the removable medium 1 in the recordable/reproducible state in S306. For example, in the CD-R/RW recording/reproduction apparatus, the kind of the medium 1 is identified and adjustment and acquisition of disk information necessary for the recording/reproduction operation according to the kind of the medium 1 are performed to set the medium 1 in the recordable/reproducible-state. Thereafter, in S307, recording on the removable medium 1 or reproduction from the removable medium 1 is performed according to a command from the host computer 3. Even after the completion of these processings, the power supply controller 13 is in the non-operating state. Accordingly, power supply by the power supply device 7 is continued in S308.

The operation when power is supplied only to the power supply controller 13 by the continuous power supply device 8 while no power is supplied from the power supply device 7 to each of the host computer 3 and the main power operating section 9 will next be described. When no power is supplied to the main power operating section 9, the power supply controller 13 is in the state of being able of control operations to supply power by the power supply device 7 and stop the supply of power.

Figure 4B:
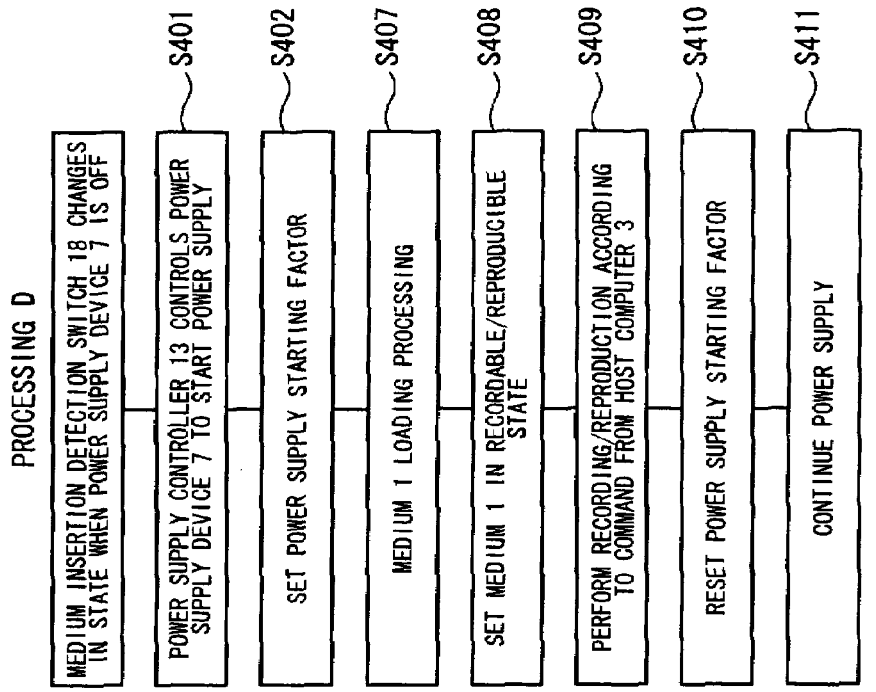
FIG. 4B is a flowchart showing another flow of medium loading/ejection processing in the apparatus shown in FIG. 1.
Figure 4A:
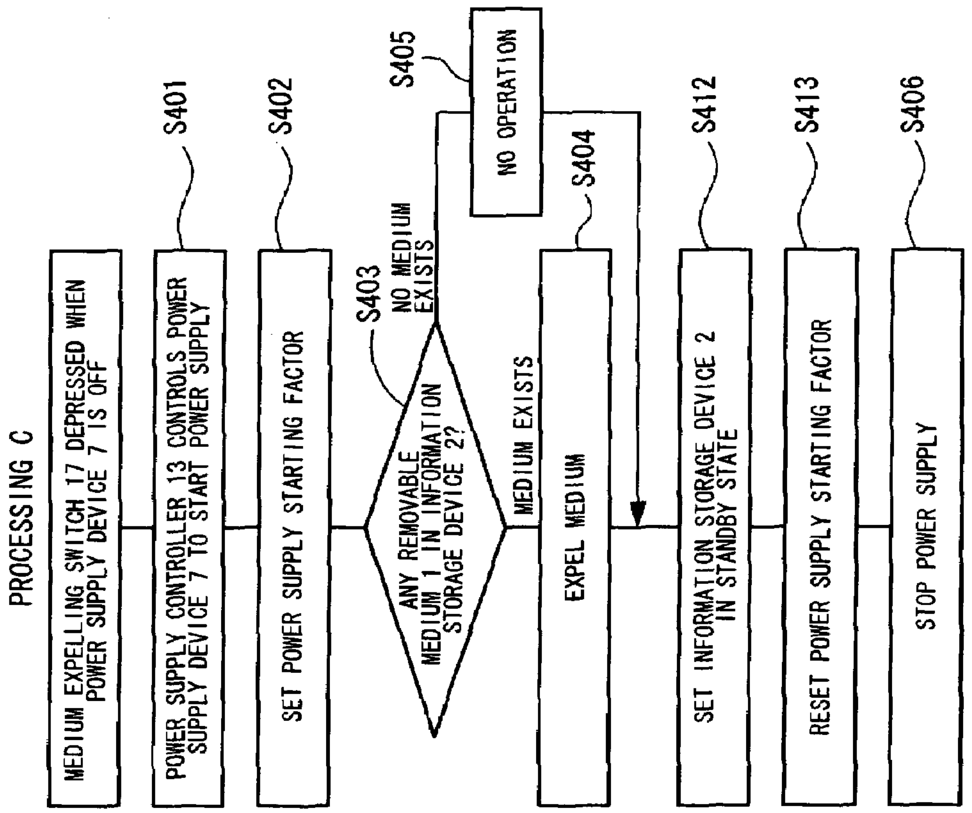
FIG. 4A is a flowchart showing another flow of medium loading/ejection processing in the apparatus shown in FIG. 1.

If in this state the medium expelling switch 17 is depressed (processing C shown in FIG. 4A is executed) or the logical state of the medium insertion detection switch 18 is changed (processing D shown in FIG. 4B is executed), the power supply controller 13 first detects the depression of the medium expelling switch 17 or the medium insertion detection switch 18 and starts supplying power to the main power operating section 9 and to the host computer 3 by controlling the power supply device 7 in S401. At this time, the power supply controller 13 notifies the CPU 11 that the medium expelling switch 17 or the logic of the medium insertion detection switch 18 has been changed during shutdown of the power supply device 7 (S402). More specifically, for example, the CPU 11 has a device for accessing a register on the power supply controller 13; information on the switch changed in state is stored in the register after power-on of the main power operating section 9 or at the time of resetting; and the CPU 11 determines on the basis of the logical state of the switch whether the cause of power-on is depression of the medium expelling switch 17 or a change in logical state of the medium insertion detection switch 18 or power-on has been effected by means of the power switch 6 independently of the change in state of the medium expelling switch 17 or the medium insertion detection switch 18.

When power supply is started according to the detected power-on factor, i.e., depression of the medium expelling switch 17 as shown in FIG. 4A, the CPU 11 determines whether or not the removable medium 1 exists in the information storage device 2 (S403). If the medium exists, the CPU 11 performs a medium expelling operation (S404) and sets the information storage device 2 in the standby state in S412. If the medium does not exist, the CPU 11 performs no operation (S405) and sets the information storage device 2 in the standby state in S412.

When the logical state of the medium insertion detection switch 18 is changed as shown in FIG. 4B, the loading/ejection control section 10 is operated according to the switch logic change in the medium loading sequence relating to the structure of the information storage device 2 in S407 to drive the medium transport device 12, draw the removable medium 1 into the information storage device 2 and set it in the recordable/reproducible state in S408. For example, in the CD-R/RW recording/reproduction apparatus, the kind of the medium is identified and adjustment and acquisition of disk information necessary for the recording/reproduction operation according to the kind of the medium are performed to set the medium in the recordable/reproducible state. Thereafter, in S409, reproduction of data in the removable medium 1 or processing for recording data can be performed on the host computer 3.

When, as in processing E shown in FIG. 5A, the power switch 6 is depressed to start power supply without a change in state of any of the switches, both the power supply device 7 and the continuous power supply device 8 first start supplying power in S501 from the shutoff state. Thus, the ordinary power-on initialization processing is performed when the information storage device 2 is reset in a hardware reset manner. This initialization processing is as described below. After the start of power supply by the power supply device 7, the power supply controller 13 is made inoperable as described above (S502); determination is made, for example, as to whether or not the removable medium 1 has been loaded into the device (S503); and the operation to make the medium 1 recordable/reproducible is performed (S504) if the medium 1 has been loaded (S504). The operation to reproduce data in the medium 1 or record data is performed as required according to a command from the host computer 3 (S505). If the removable medium 1 has not been loaded, the information storage device 2 is set in the standby state in S506.

Also, the supply of power to the main power operating section 9 and to the host computer 3 can be further controlled according to the factor responsible for the start of power supply. For example, after starting power supply upon depression of the medium expelling switch 17 and performing the medium expelling operation, the information storage device 2 is set in the standby state in S412 of FIG. 4A and the CPU 11 controls the power supply controller 13 to reset the power supply starting factor in S413 and thereafter stop supplying power to the main power operating section 9 and to the host computer 3 by the power supply device 7 in S406. Thus, when the medium expelling switch 17 is depressed in the power supply shutoff state, the supply of power to the main power operating section 9 and to the host computer 3 can be shut off after performing the medium expelling operation.

In a situation where the logical state of the medium insertion detection switch 18 is changed; power supply is started; and the removable medium 1 is loaded into the information storage device and set in the recordable/reproducible state, the power supply controller 13 is controlled in S410 of FIG. 4B to reset and cancel the information on the factor responsible for the start of power supply, thereby making the power supply controller 13 inoperable. In the next S411, the supply of power to the main power operating section 9 and to the host computer 3 is continued. In a situation where the removable medium 1 cannot be loaded into the information storage device 2 or does not exist even after the logical state of the medium insertion detection switch 18 has been changed and power supply has been started, the supply of power to the main power operating section 9 and to the host computer 3 by the power supply device 7 can be stopped by the CPU 11 controlling the power supply controller 13.

In a situation where the power switch 6 is depressed and the power supply device 7 starts supplying power to the main power operating section 9 and to the host computer 3 or both the power supply device 7 and the continuous power supply device 8 start supplying power from the state in which both the power supply devices 7 and 8 are shut off, the power supply controller 13 is inoperable irrespective of the existence/nonexistence of the removable medium 1 and the power supply device 7 therefore continues supplying power (S507).

The operation at the time of power-down in either of the case of power-down of the power supply device 7 under the control of the power supply controller 13 and the case of power-down of the power supply device 7 by operating the power switch 6 as in processing F shown in FIG. 5B is such that the command from the CPU 11 to make the power supply controller 13 inoperative is cancelled in S509 and the power supply controller 13 becomes operative in S510.

Embodiment 1 has been described by way of example with respect to a case where the power supply controller 13 is made operative or inoperative by control through a port from the CPU 11. Embodiment 1, however, can also be implemented by using any of other various methods such as a method of monitoring the power supply condition of the power supply device 7 by the power supply controller 13.

Embodiment 1 has been described by way of example with respect to a case where no operation is performed and the information storage device 2 is set in the standby state when the removable medium 1 does not exist in the information storage device 2 in the state where the main power operating section 9 of the information storage device 2 is supplied with power. Embodiment 1, however, can also be implemented in such a manner that the medium expelling operation is performed by operating the loading/ejection control section 10 in the same manner and driving the medium transport device 12 in order to prevent inability to expel the removable medium 1 due to failure to normally detect the existence of the removable medium 1 in the information storage device 2.

Embodiment 1 has been described by way of example with respect to a case where the information storage device 2 is set in the standby state when the removable medium 1 does not exist in the information storage device 2 in the state where the main power operating section 9 of the information storage device 2 is supplied with power. However, setting in the standby state is an operation performed in ordinary information storage devices. Embodiment 1 can also be implemented without setting in the standby state.

Embodiment 1 has been described by way of example with respect to a case where supply of power to the information storage device 2 is started by operating the medium expelling switch 17 to perform the operation to expel the removable medium 1. Embodiment 1, however, can also be implemented in such a manner that the medium expelling operation is performed by using a mechanism for forcibly expelling the medium without power supply and only the medium loading operation is performed by the described method in this embodiment.

Embodiment 1 has been described by way of example with respect to the method in which the CPU 11 detects a factor responsible for a start of power supply from information in the register of the power supply controller 13. Embodiment 1, however, can also be implemented by using any method capable of notifying the CPU 11 of a power supply starting factor, e.g., a method in which, after detecting the operation of the medium expelling switch 17 or detection of the change in logical state of the medium insertion detection switch 18, the power supply controller 13 switches from a terminal connected to the switch 17 or 18 to an output terminal while maintaining the changed logical state, inputs the logical state to the CPU 11, and, after setting the logical state (e.g., L normally set, or H set when the power supply is turned on by the switch factor) for notifying of turning on of power supply through the change in state of the switch by using one terminal connected to the CPU 11, controls the power supply device 7 to start supplying power to the main power operating section 9 and to the host computer 3.

As described above, the power supply controller 13 is incapable of stopping power supply but capable of being implemented as a logic circuit of an extremely simple and small scale and ensuring a power consumption much lower than that in case where power supply is shut off on a block-by-block basis in an IC to supply power only to the necessary block, as in a standby or sleeping state of an ordinary information storage device.

Thus, according to this embodiment, in the slot-loading-type information storage device in particular, power is supplied only to the power supply controller 13 when power supply to the host computer 3 and to the main power operating section 9 is stopped, thereby minimizing the power consumption when power supply for the entire apparatus is stopped. Also, power supply is started when required by detecting a change in depressed state of the plurality of switches 6, 17, and 18 provided in the information storage device 2 and the loading/ejection operation can be suitably performed according to the logical states of the plurality of switches 6, 17, and 18. Further, the power supply device 7 is controlled according to the performed loading/ejection operation to stop or continue supplying power to the main power operating section 9 and to the host computer 3. Thus, an information processing apparatus and a power supply control method for the information processing apparatus can be provided in which the information storage device 2 can automatically perform processing according to the contents of the medium 1 after loading by inserting the medium 1.

Embodiment 2

Embodiment 2 of the present invention will be described below with reference to FIGS. 6, 7, 8A, 8B, 9A, 9B, and 10.

FIG. 6 is a block diagram of a configuration in case where the information processing apparatus of the present invention is applied to a tray type of CD-R/RW recording/reproduction apparatus. Reference numeral 1 denotes a removable medium, e.g., a CD-ROM/R/RW, a DVD-ROM/R/RW, a DVD-RAM, a DVD-RAM in a cartridge, or a semiconductor memory medium. This embodiment will be described with respect to a case where the removable medium is a CD-R/RW disk. FIG. 7 is a perspective view showing an external appearance when the removable medium is inserted in the tray-type CD-R/RW recording/reproduction apparatus. FIGS. 8A, 8B, and 9A, 9B, and 10 are flowcharts each showing the flow of medium loading/ejection processing in the information processing apparatus in Embodiment 2.

Referring to FIGS. 6 and 7, reference numeral 2 denotes an information storage device into which the removable medium 1 is loaded, and which reproduces data from the removable medium 1 or records data on the removable medium 1. Reference numeral 3 denotes a host computer which is connected to the information storage device 2 by an interface device 4, and which performs operations to supply various operating instructions to the information storage device 2 and receive data reproduced in the information storage device 2 through the interface device 4. Ordinarily, the interface device 4 uses a standardized interface, e.g., ATAPI, SCSI, USB or IEEE 1394 for communication between the computer 3 and the information storage device 2. Needless to say, the apparatus can be implemented in the same manner by using a device in conformity with a standard other than these standards as the interface device 4 if the device is capable of data/instruction exchange between the host computer 3 and the information storage device 2.

Reference numeral 5 denotes a power supply unit constituted by a power supply device 7 which is turned on/off by a power switch 6, and a continuous power supply device 8 which, even when the power supply switch 6 is turned off, continuously supplies power as long as power is supplied to the power supply unit 5. The power supply device 7 supplies power to the host computer 3 and to a main power operating section 9 in the information storage device 2. The main power operating section 9 in the information storage device 2 is a section for performing main functions of the information storage device 2. The main power operating section 9 includes a loading/ejection control section 10, a CPU 11 and a removable medium reproduction device not shown in the figures. The continuous power supply device 8 supplies power to a power supply controller 13 in the information storage device 2. The power supply controller 13 operates by being supplied with the least necessary power necessary for operation even when the supply of power to the host computer 3 and the main power operating section 9 is shut off.

Reference numeral 32 denotes a tray expelling detection switch, and reference numeral 34 a tray operating switch. The tray operating switch 34 is provided on an outer portion of the information storage device 2 and is depressed by a user to perform an operation to loading or ejecting the medium transport tray 31. The tray expelling detection switch 32 is provided inside the device 2 to detect a state in which the medium transport tray 31 is completely expelled.

When power is being supplied from the power supply device 7 on the basis of the state of the switch detected or a change in the switch state, the CPU 11 determines the necessary processing and operates the loading/ejection control section 10 to perform the loading/ejection operation by driving a tray drive device 33. As the tray drive device 33 in a tray-loading-type information storage device for example, a type of device is generally known which drives the medium transport tray 31 by a combination of a loading motor, a first gear, and a second gear provided on the medium transport tray 31. As shown in FIG. 7, in the tray-loading-type information storage device 2 of Embodiment 2, the removable medium 1 is automatically transported into the device 2 and set in a recordable/reproducible state by a user directly placing the medium 1 on the medium transport tray 31 and thereafter depressing the tray operating switch 34, or changing the logical state of the tray expelling detection switch 32 by pushing the medium transport tray 31 directly into the information storage device 2. At the time of expelling, the user also depresses the tray operating switch 34 to expel the removable medium 1 out of the device 2 together with the medium transport tray 31. When the medium transport tray 31 is completely expelled out of the device 2 to change the logical state of the tray expelling detection switch 32, the expelling operation is stopped.

The actual operation when loading/ejection is performed will next be described in detail.

The operation when power is supplied from the power supply device 7 to the host computer 3 and to the main power operating section 9 will first be described. When the main power operating section 9 is supplied with power, the CPU 11 controls the power supply controller 13 so that the power supply control operation on the power supply device 7 is not performed. For example, an output port from the CPU 11 to the power supply controller 13 may be prepared to set the power supply controller 13 in a shut down state, i.e., a non-operating state, when the output state from the CPU 11 is H.

Figure 8A:
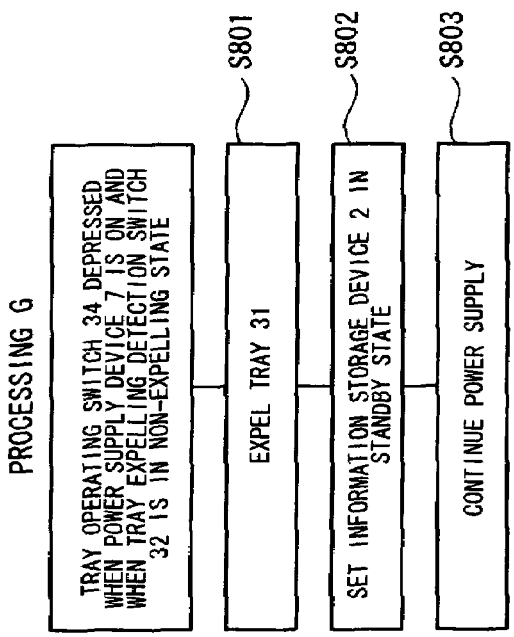
FIG. 8A is a flowchart showing a flow of medium loading/ejection processing in the apparatus shown in FIG. 6.

When the tray operating switch 34 is depressed in this state while the logic of the tray expelling detection switch 32 is not in the tray expelling state, processing G shown in FIG. 8A is executed. That is, regardless of whether or not the removable medium 1 has been loaded into the information storage device 2, the CPU 11 operates the loading/ejection control section 10 to drive the tray drive device 33 and expel the medium transport tray 31 out of the information storage device 2 in S801 after detecting the depression of the tray operating switch 34. When the medium transport tray 31 is completely expelled out of the information storage device 2, the logical state of the tray expelling detection switch 32 is changed as described above and the CPU 11 detects this change and stops the medium transport tray 31 expelling operation. Needless to say, if the removable medium 1 exists in the information storage device 2, and if it is a disk storage medium and is in a rotating state, it is expelled after being stopped from rotating. If the removable medium 1 is a non-disk medium such as a semiconductor memory, necessary processing such as access suspension is performed. The information storage device 2 is thereafter set in the standby state in S802. After the completion of these processings, the power supply controller 13 is in the non-operating state and, accordingly, power supply from the power supply device 7 is continued in S803.

Figure 8B:
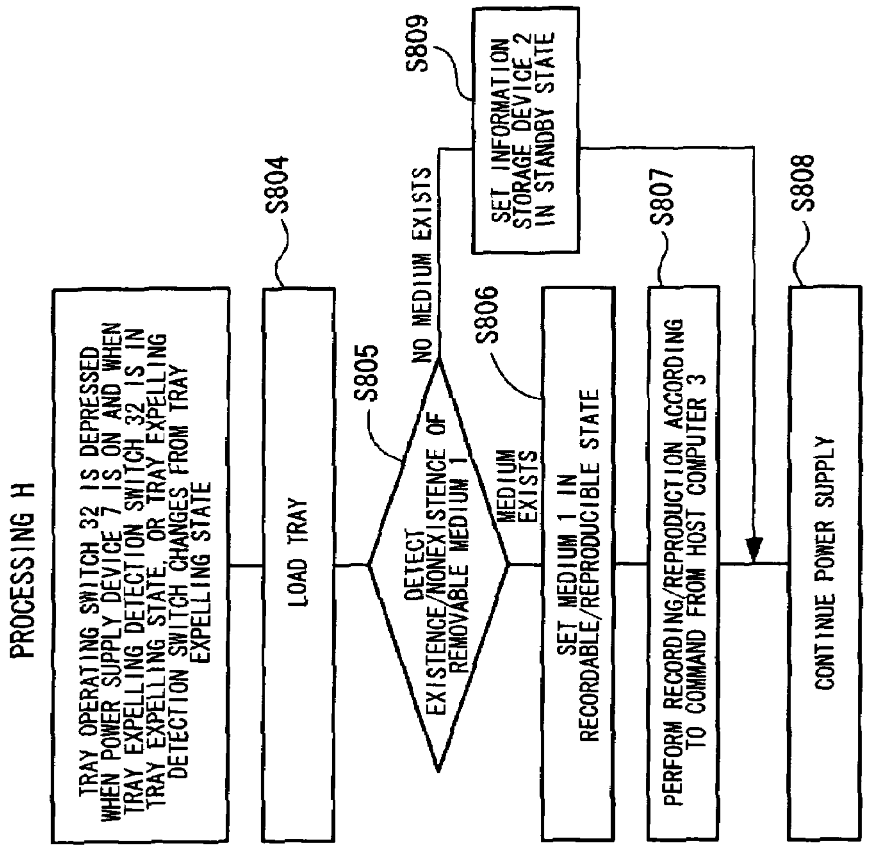
FIG. 8B is a flowchart showing another flow of medium loading/ejection processing in the apparatus shown in FIG. 6.

When the tray operating switch 34 is depressed while the tray expelling detection switch 32 is in the tray expelling state, or when the tray expelling detection switch 32 changes from the tray expelling state, processing H shown in FIG. 8B is executed. When the CPU 11 detects depression of the tray operating switch 34 or a change in the state of the tray expelling detection switch 32, it operates the loading/ejection control section 10 to drive the tray drive device 33 and draw the medium transport tray 31 into the information storage device 2 in S804. The CPU 11 detects the existence/nonexistence of the removable medium 1 in S805. If the removable medium 1 is not placed on the medium transport tray 31, the CPU 11 sets the information storage device 2 in the standby state in S809. If the removable medium 1 is placed on the medium transport tray 31, the CPU 11 sets the medium 1 in the recordable/reproducible state in S806. For example, in the CD-R/RW recording/reproduction apparatus, the kind of the medium 1 is identified and adjustment and acquisition of disk information necessary for the recording/reproduction operation according to the kind of the medium 1 are performed to set the medium 1 in the recordable/reproducible state. Thereafter, in S807, recording on the removable medium 1 or reproduction from the removable medium 1 is performed according to a command from the host computer 3.

Even after the completion of these processings, the power supply controller 13 is in the non-operating state. Accordingly, power supply by the power supply device 7 is continued in S808.

The operation when power is supplied only to the power supply controller 13 by the continuous power supply device 8 while no power is supplied from the power supply device 7 to each of the host computer 3 and the main power operating section 9 will next be described. When no power is supplied to the main power operating section 9, the power supply controller 13 is in the operable state.

If in this state the tray operating switch 34 is depressed, processing I shown in FIG. 9A is executed when the power supply controller 13 detects the depression of the tray operating switch 34. First, in S901, the power supply device 7 is controlled to start supplying power to the main power operating section 9 and to the host computer 3. At this time, in S902, the power supply controller 13 notifies the CPU 11 that the tray operating switch 34 has been depressed during shutdown of the power supply device 7. More specifically, for example, the CPU 11 has a device for accessing a register on the power supply controller 13; information on the switch changed in state is stored in the register after power-on for the main power operating section 9 or at the time of resetting of the information storage device 2; and the CPU 11 determines on the basis of the logical state of the switch whether the cause of power-on is depression of the tray operating switch 34 or a change in logical state of the tray expelling detection switch 32 or power-on has been effected by means of the power switch 6 independently of the change in state of the tray operating switch 34 or the tray expelling detection switch 32. The CPU 11 performs the loading or ejecting operation according to the detected power-on factor and the state of the medium transport tray 31 (S903). When the tray expelling detection switch 32 is in the tray expelling state, the CPU 11 operates the loading/ejection control section 10 to drive the tray drive device 33 and draw the medium transport tray 31 into the information storage device 2 in S904 and detects the existence/nonexistence of the removable medium 1 in S905. At this time, if the removable medium 1 is not placed on the medium transport tray 31, the CPU 11 sets the information storage device 2 in the standby state in S906. If the removable medium 1 is placed on the medium transport tray 31, the CPU 11 sets the removable medium 1 in the recordable/reproducible state in S907. For example, in the CD-R/RW recording/reproduction apparatus, the kind of the medium 1 is identified and adjustment and acquisition of disk information necessary for the recording/reproduction operation according to the kind of the medium 1 are performed to set the medium 1 in the recordable/reproducible state.

If the tray expelling detection switch 32 is not in the tray expelling state after power supply has been started by depressing the tray operating switch 34, the CPU 11 operates the loading/ejection control section 10 to drive the tray drive device 33 and expel the medium transport tray 31 out of the information storage device 2 in S910. When the medium transport tray 31 is completely expelled out of the information storage device 2, the logical state of the tray expelling detection switch 32 is changed as described above and the CPU 11 detects this change and stops the medium transport tray 31 expelling operation. Thereafter, in S906, the CPU 11 sets the information storage device 2 in the standby state.

If the logical state of the tray expelling detection switch 32 is changed from the expelling state when the power supply controller 13 is in the operable state, processing J shown in FIG. 9B is executed. That is, in S911, the power supply device 7 is first controlled to start supplying power to the main power operating section 9 and to the host computer 3. At this time, in S912, the power supply controller 13 notifies the CPU 11 that the logical state of the tray expelling detection switch 32 has been changed during shutdown of the power supply device 7. Subsequently, the loading/ejection control section 10 is operated in S904 to drive the tray drive device 33 and draw the medium transport tray 31 into the information storage device 2, as in the case where the tray expelling detection switch 32 is in the tray expelling state when depression of the tray operating switch 34 is detected. Next, the existence/nonexistence of the removable medium 1 is detected in S905. If the removable medium 1 is not placed on the medium transport tray 31, the information storage device 2 is set in the standby state in S906. If the removable medium 1 is placed on the medium transport tray 31 in S905, it is set in the recordable/reproducible state in S907. For example, in the CD-R/RW recording/reproduction apparatus, the kind of the medium 1 is identified and adjustment and acquisition of disk information necessary for the recording/reproduction operation according to the kind of the medium 1 are performed to set the medium 1 in the recordable/reproducible state. Thereafter, in S908, the power supply starting factor is reset to make the power supply controller 13 inoperable. Thereafter, in S909, reproduction of data in the removable medium 1 or processing for recording data can be performed on the host computer 3.

Figure 10:
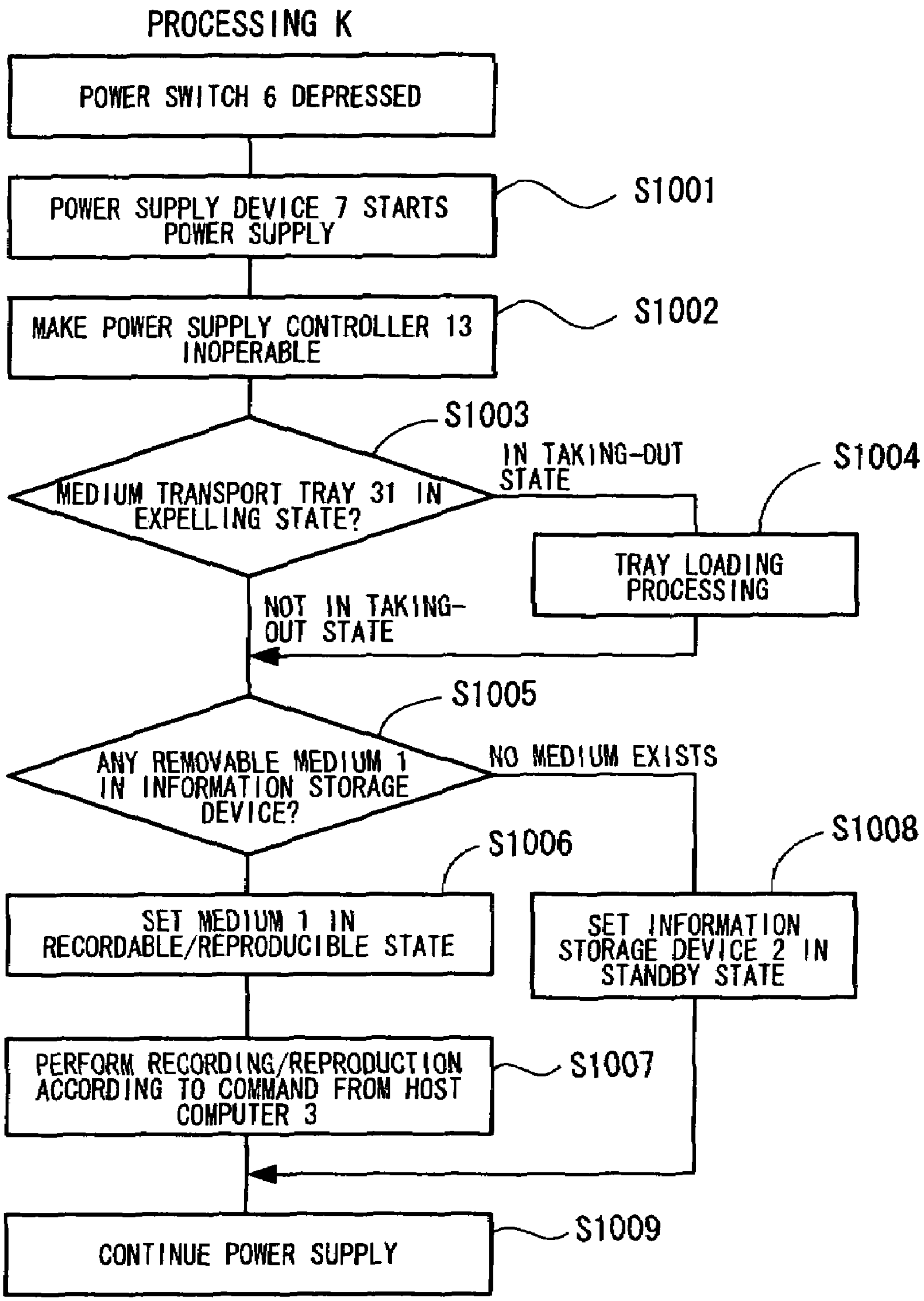
FIG. 10 is a flowchart showing yet another flow of medium loading/ejection processing in the apparatus shown in FIG. 6.

When, as in processing K shown in FIG. 10, the power switch 6 is depressed to start power supply without a change in state of any of the switches 32 and 34, both the power supply device 7 and the continuous power supply device 8 start supplying power from the shutoff state (S1001). Thus, the information storage device 2 is reset in a hardware reset manner to perform the ordinary power-on initialization processing. In this initialization processing, after initialization of the CPU 11, for example, as described above, any factor to start supplying power to the power supply controller 13 is checked, the power supply controller 13 is made inoperable if no power supply starting factor is set (S1002), and the tray expelling detection switch 32 is subsequently checked in S1003 to determine whether or not the medium transport tray 31 is in the expelling state. If the medium transport tray 31 is in the expelling state, tray loading processing is performed in S1004. If the medium transport tray 31 is not in the expelling state, or after the tray loading processing has been performed, determination is made, for example, as to whether or not the removable medium 1 has been loaded into the device (S1005). If the removable medium 1 has been loaded, the operation to set the medium in the recordable/reproducible state is performed (S1006). The operation to reproduce data in the medium or record data is performed as required according to a command from the host computer 3 (S1007). If the medium 1 has not been loaded, the information storage device 2 is set in the standby state in S1008.

Also, the supply of power to the main power operating section 9 and to the host computer 3 can be further controlled according to the factor responsible for the start of power supply.

For example, in a situation where power supply is started by depressing the tray operating switch 34 as shown in FIG. 9A and the tray expelling operation is performed, in a situation where power supply is started by depressing the tray operating switch 34 and the medium transport tray 31 is loaded into the information storage device 2 but the removable medium 1 does not exist on the medium transport tray 31, or in a situation where power supply is started according to the change in state of the tray expelling detection switch 32 as shown in FIG. 9B and the medium transport tray 31 is loaded into the information storage device 2 but the removable medium 1 does not exist on the medium transport tray 31, the power supply starting factor is reset in S908 and the CPU 11 thereafter controls the power supply controller 13 to stop the power supply device 7 from supplying power to the main power operating section 9 and to the host computer 3 in S913, thus shutting off power to the main power operating section 9 and to the host computer 3.

Also, in a situation where power supply is started by depressing the tray operating switch 34 as shown in FIG. 9A and the removable medium 1 is loaded into the information storage device 2 and set in the recordable/reproducible state, or in a situation where power supply is started according to the change in state of the tray expelling detection switch 32 as shown in FIG. 9B and the removable medium 1 is loaded into the information storage device 2 and set in the recordable/reproducible state, the power supply starting factor is reset in S908 to set the power supply controller 13 in the inoperable state. Thereafter, in S909, reproduction of the data from the removable medium 1 or recording on the removable medium 1 can be performed on the host computer 3, and power supply from the power supply device 7 is continued (S914).

Referring to FIG. 10, when the power switch 6 is depressed and the power supply device 7 starts supplying power to the main power operating section 9 and to the host computer 3 or both the power supply device 7 and the continuous power supply device 8 start supplying power from the state in which both the power supply devices 7 and 8 are shut off, the power supply controller 13 is inoperable irrespective of the existence/nonexistence of the removable medium 1 and the power supply device 7 therefore continues supplying power (S1009).

The operation at the time of power-down is the same as that in Embodiment 1. That is, in the operation in either of the case of power-down of the power supply device 7 under the control of the power supply controller 13 and the case of power-down of the power supply device 7 by operating the power switch 6 as in processing F shown in FIG. 5B, the command from the CPU 11 to make the power supply controller 13 inoperative is cancelled in S509 and the power supply controller 13 becomes operative in S510.

Embodiment 2 has been described by way of example with respect to a case where the power supply controller 13 is made operative or inoperative by control through a port from the CPU 11. Embodiment 2, however, can also be implemented by using any of other various methods such as a method of monitoring the power supply condition of the power supply device 7 by the power supply controller 13.

Embodiment 2 has been described by way of example with respect to a case where supply of power to the main power operating section 9 is started by operating the tray operating switch 34 to perform the operation to expel the medium transport tray 31. Embodiment 2, however, can also be implemented in such a manner that the tray expelling operation is performed by using a mechanism for forcibly expelling the tray without power supply and only the tray loading operation is performed by the described method in Embodiment 2.

Embodiment 2 has been described by way of example with respect to a case where the information storage device 2 is set in the standby state when the removable medium 1 does not exist in the information storage device 2 in the state where the main power operating section 9 of the information storage device 2 is supplied with power, or when the medium transport tray 31 is expelled. However, setting in the standby state is an operation performed in ordinary information storage devices 2. Embodiment 2 can also be implemented without setting in the standby state.

Embodiment 2 has been described by way of example with respect to a case where the CPU 11 detects a factor responsible for a start of power supply from information in the register of the power supply controller 13. Embodiment 2, however, can also be implemented by using any arrangement capable of notifying the CPU 11 of a power supply starting factor, e.g., an arrangement in which, after detecting the change in logical state of the tray operating switch 34 or the tray expelling detection switch 32, the power supply controller 13 switches from a terminal connected to the switch 32 or 34 to an output terminal while maintaining the changed logical state, inputs the logical state to the CPU 11, and, after setting the logical state (e.g., L normally set, or H set when the power supply is turned on by the switch factor) for notifying of turning on of power supply through the change in state of the switch by using one terminal connected to the CPU 11, controls the power supply device 7 to start supplying power to the main power operating section 9 and to the host computer 3.

As described above, the power supply controller 13 is incapable of stopping power supply but capable of being implemented as a logic circuit of an extremely simple and small scale and ensuring a power consumption much lower than that in case where power supply is shut off on a block-by-block basis in an IC to supply power only to the necessary block, as in a standby or sleeping state of an ordinary information storage device.

Thus, according to Embodiment 2, in the tray-loading-type information storage device in particular, power is supplied only to the power supply controller 13 when power supply to the host computer 3 and to the main power operating section 9 is stopped, thereby minimizing the power consumption when power supply for the entire apparatus is stopped. Also, power supply is started when required by detecting a change in depressed state of the plurality of switches provided in the information storage device 2 and the loading/ejection operation can be suitably performed according to the logical states of the plurality of switches. Further, the power supply device 7 is controlled according to the performed loading/ejection operation to stop or continue supplying power to the main power operating section 9 and to the host computer 3. Thus, an information processing apparatus and a power supply control method for the information processing apparatus can be provided in which processing according to the contents of the medium 1 can be automatically performed after loading by inserting the medium 1.

Embodiment 3

Embodiment 3 of the present invention will be described below with reference to FIGS. 11, 12, 13A, 13B, 14A, 14B, and 15.

Figure 11:
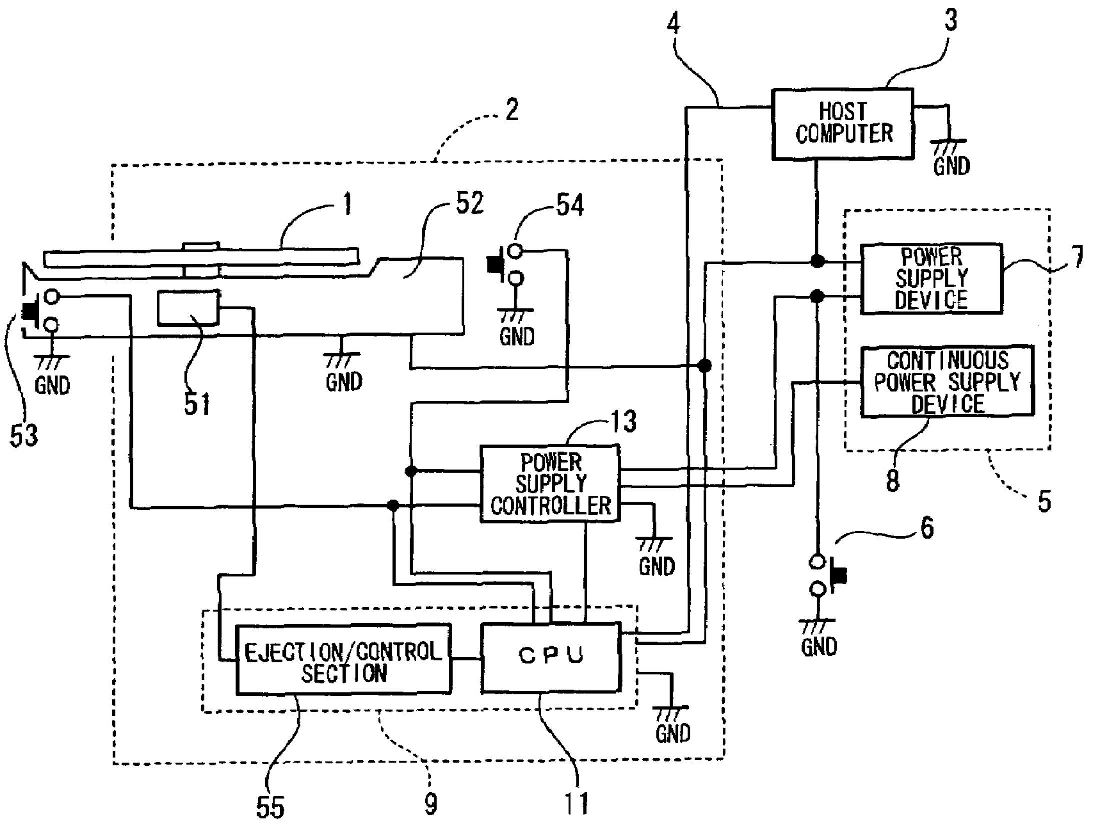
FIG. 11 is a block diagram of an information processing apparatus in Embodiment 3 in which the present invention is applied to a slim tray type of CD-R/RW recording/reproduction apparatus.
Figure 12:
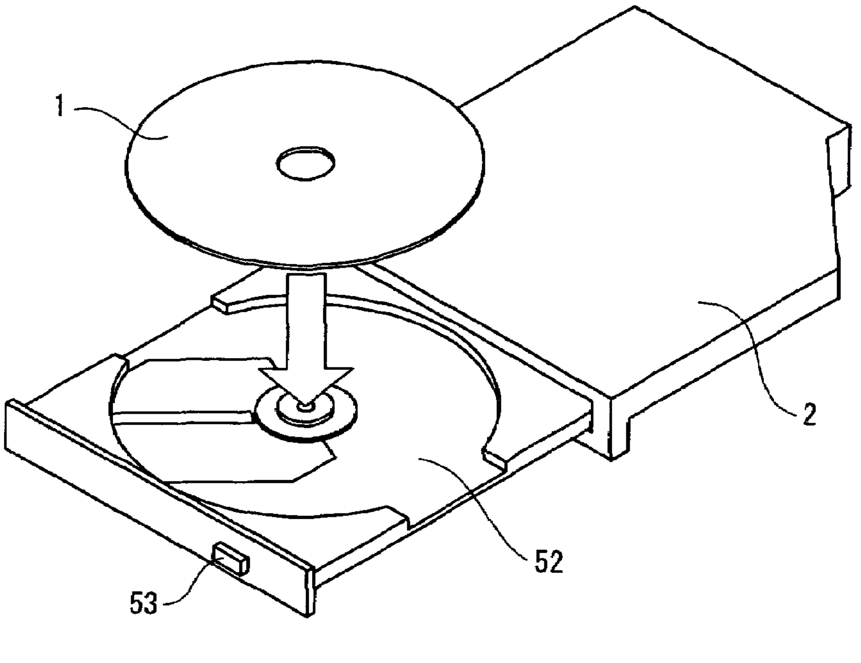
FIG. 12 is a perspective view or an external appearance when a removable medium is inserted in the slim tray type of CD-R/RW recording/reproduction apparatus shown in FIG. 11.

FIG. 11 is a block diagram of a configuration in case where the information processing apparatus of the present invention is applied to a slim tray type of CD-R/RW recording/reproduction apparatus. Reference numeral 1 denotes a removable medium, e.g., a CD-ROM/R/RW, a DVD-ROM/R/RW, a DVD-RAM, a DVD-RAM in a cartridge, or a semiconductor memory medium. This embodiment will be described with respect to a case where the removable medium is a CD-R/RW disk. FIG. 12 is a perspective view showing an external appearance when the removable medium is loaded into the slim-tray-type CD-R/RW recording/reproduction apparatus.

Referring to FIGS. 11 and 12, reference numeral 2 denotes an information storage device into which the removable medium 1 is loaded, and which reproduces data from the removable medium 1 or records data on the removable medium 1. Reference numeral 3 denotes a host computer which is connected to the information storage device 2 by an interface device 4, and which performs operations to supply various operating instructions to the information storage device 2 and receive data reproduced in the information storage device 2 through the interface device 4. Ordinarily, the interface device 4 uses a standardized interface, e.g., ATAPI, SCSI, USB or IEEE1394 for communication between the computer 3 and the information storage device 2. Needless to say, the apparatus can be implemented in the same manner by using an interface device in conformity with a standard other than these standards if the interface device is capable of data/instruction exchange between the host computer 3 and the information storage device 2.

Reference numeral 5 denotes a power supply unit constituted by a power supply device 7 which is turned on/off by a power switch 6, and a continuous power supply device 8 which, even when the power supply switch 6 is operated, continuously supplies power as long as power is supplied to the power supply unit 5. The power supply device 7 supplies power to the host computer 3 and to a main power operating section 9 in the information storage device 2. The main power operating section 9 in the information storage device 2 is a block for performing main functions of the information storage device 2. The main power operating section 9 includes an ejection control section 55 and a CPU 11. Reference numerals 52 denote a medium tray which includes a tray lock release device 51 and a removable medium reproduction device not shown in the figures. The medium tray is also operated by power supply from the power supply device 7. The continuous power supply device 8 supplies power to a power supply controller 13 in the information storage device 2. The power supply controller 13 operates by being supplied with the least necessary power necessary for operation even when the supply of power to the host computer 3 is shut off.

Reference numeral 53 denotes a tray expelling switch, and reference numeral 54 a tray lock detection switch. The tray expelling switch 53 is provided on an outer portion of the information storage device 2 and is depressed by a user to electrically release the medium tray 52 from a state of being locked in the information storage device 2. This release from the locked state enables the medium tray 52 to be expelled out of the information storage device 2 by the tray expelling switch 53 and the action of an elastic member, such as a spring, which is provided between the information storage device 2 and the medium tray 52, and which is not shown in the figures. The tray lock detection switch 54 is a switch provided in the device 2 to detect the state of the medium tray 52 fully pushed into the information storage device 2 and locked.

When power is being supplied from the power supply device 7 on the basis of the state of the switch detected or a change in the switch state, the CPU 11 to which the switches 53 and 54 are connected determines the necessary processing to perform an operation to expel the medium tray 52 or an operation to set the removable medium 1 in a recordable/reproducible state.

As the tray lock release device 51 in the slim-tray-loading-type information storage device in Embodiment 3 for example, a type of device is generally known which releases the medium tray 52 in the information storage device 2 from the locked state by a magnetic drive device such as a plunger. In the slim-tray-loading-type information storage device 2 described in the description of Embodiment 3, the removable medium 1 is locked on a turn table on the medium tray 52 including the medium reproduction device not shown in the figures, as shown in FIG. 12, a user then pushes the medium tray 52 into the information storage device 2 to set the tray in the locked state, and the logical state of the tray lock detection switch 54 is changed to start an operation to set the removable medium 1 in the recordable/reproducible state.

The actual operation when loading/ejection is performed will next be described in detail.

The operation when power is supplied from the power supply device 7 to the host computer 3 and to the main power operating section 9 will first be described. When the main power operating section 9 is supplied with power, the CPU 11 controls the power supply controller 13 so that the power supply control operation on the power supply device 7 is not performed. For example, an output port from the CPU 11 to the power supply controller 13 may be prepared to set the power supply controller 13 in a shut down state when the output state from the CPU 11 is H.

Figure 13A:
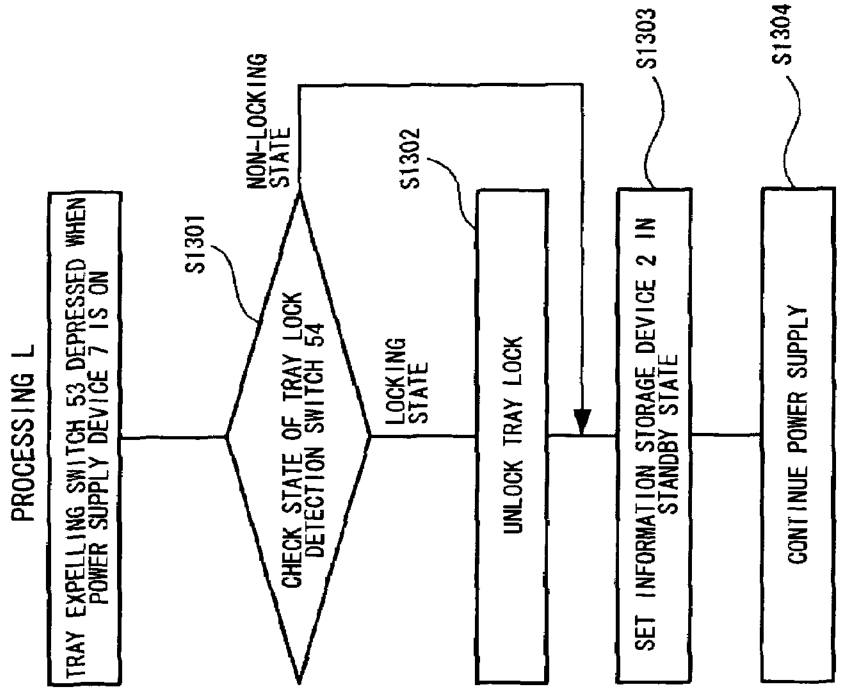
FIG. 13A is a flowchart showing a flow of medium loading/ejection processing in the apparatus shown in FIG. 11.

When the tray expelling switch 53 is depressed in this state, processing L shown in FIG. 13A is executed. In processing L, a check is first made in S1301 as to whether or not the tray lock detection switch 54 is in the locking state. If the tray lock detection switch 54 is in the locking state, the ejection control section 55 is operated in S1302 to drive the tray lock release device 51 and release the medium tray 52 from the locked state regardless of whether or not the removable medium 1 has been loaded into the information storage device 2. The medium tray 52 is then expelled out of the information storage device 2 by the action of an elastic member such as a spring provided between the medium tray 52 and the main body of the information storage device 2. Needless to say, if the removable medium 1 is a disk storage medium rotating at this time, it is expelled after being stopped from rotating. If the removable medium 1 is a non-disk medium such as a semiconductor memory, necessary processing such as access suspension is performed. Also, at this time, it is not necessary that the medium tray 52 be completely expelled out of the information storage device 2. If the medium tray 52 is expelled to a certain extent, a user can load or remove the removable medium 1 by completely drawing the medium tray 52 out of the information storage device 2 by his/her hand. No operation is performed if the tray lock detection switch 54 is in the non-tray-locking state when the tray expelling switch 53 is depressed. After these processings, the main power operating section 9, i.e., the information storage device 2 is set in the standby state in S1303. After the completion of these processings, the power supply controller 13 is in the non-operating state and, accordingly, power supply from the power supply device 7 is continued in S1304.

Figure 13B:
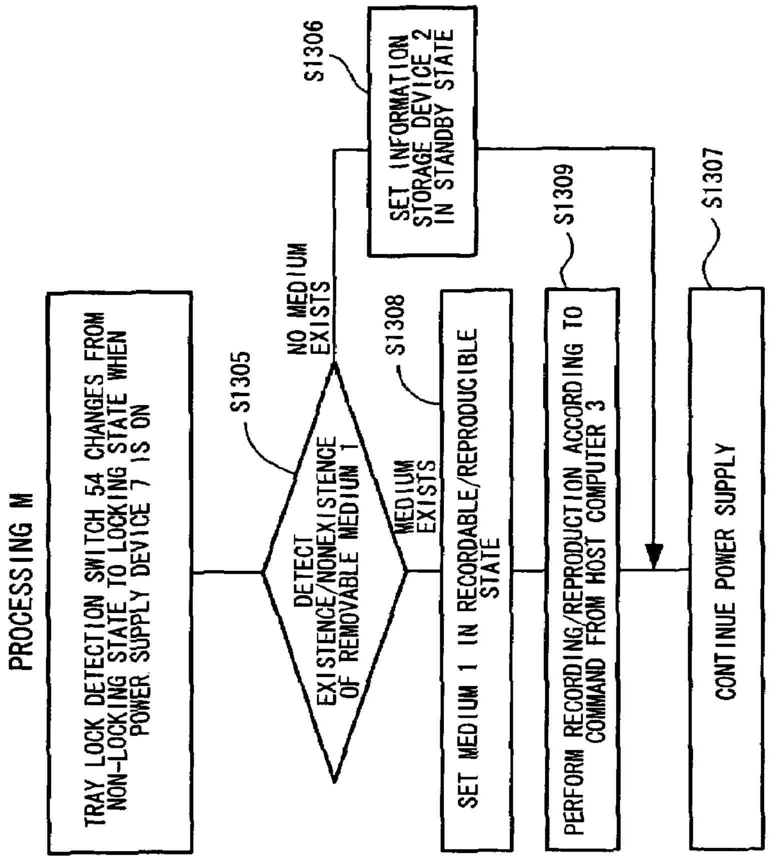
FIG. 13B is a flowchart showing a flow of medium loading/ejection processing in the apparatus shown in FIG. 11.

Description will next be made of the loading operation. When the user pushes into the information storage device 2 the medium tray 52 on which the removable medium 1 is placed or not placed and sets the medium tray 52 in the locked state from a state where the medium tray 52 is expelled, processing M shown in FIG. 13B is executed. When the medium tray 52 is set in the locked state, the tray lock detection switch 54 is changed from the non-locking state to the locking state and the CPU 11 detects this change. Subsequently, in S1305, the existence/nonexistence of the removable medium 1 is detected. If the removable medium 1 is not placed on the medium tray 52, the information storage device 2 is set in the standby state in S1306. The standby state is a state in which, while power is being supplied to the main power operating section 9 of the information storage device 2, the operations of unnecessary circuit blocks in the information storage device 2 are stopped to limit the power consumption to the least necessary level. At this time, since the power supply controller 13 is not operating, power supply from the power supply device 7 is continued in S1307.

If the removable medium 1 is placed on the medium tray 52 in S1305, it is set in the recordable/reproducible state in S1308. For example, in the CD-R/RW recording/reproduction apparatus, the kind of the medium 1 is identified and adjustment and acquisition of disk information necessary for the recording/reproduction operation according to the kind of the medium 1 are performed to set the medium 1 in the recordable/reproducible state. Thereafter, in S1309, recording on the removable medium 1 or reproduction from the removable medium 1 is performed according to a command from the host computer 3. Even after the completion of these processings, the power supply controller 13 is in the non-operating state. Accordingly, power supply by the power supply device 7 is also continued in S1307.

The operation when power is supplied to the power supply controller 13 by the continuous power supply device 8 while no power is supplied from the power supply device 7 to each of the host computer 3 and the main power operating section 9 will next be described. When no power is supplied to the main power operating section 9, the power supply controller 13 is in the operable state.

Figure 14A:
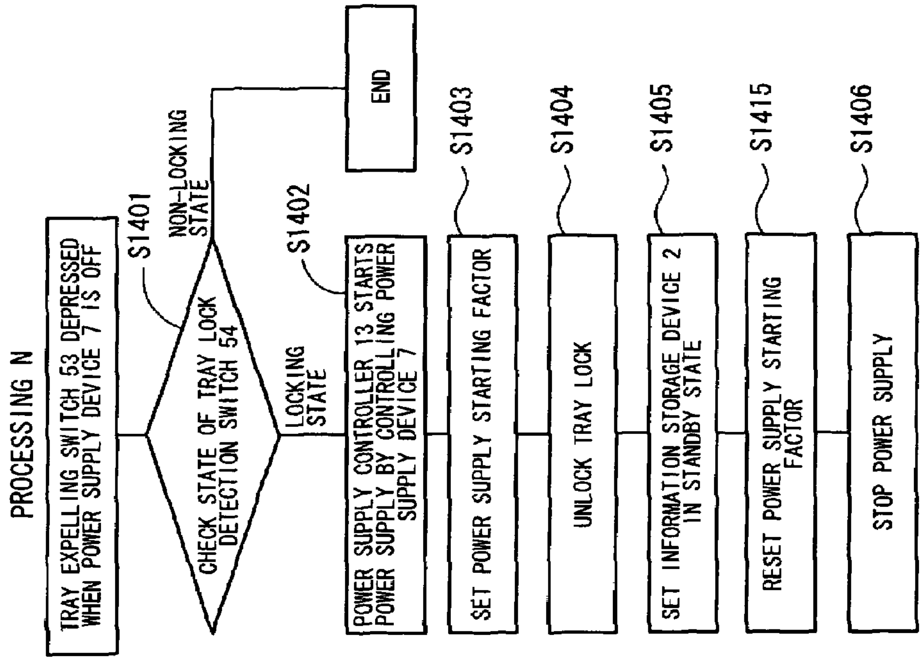
FIG. 14A is a flowchart showing another flow of medium loading/ejection processing in the apparatus shown in FIG. 11.

If in this state the tray expelling switch 53 is depressed, processing N shown in FIG. 14A is executed. In processing N, when the power supply controller 13 detects depression of the tray expelling switch 53, the tray lock logic of the tray lock detection switch 54 is detected in S1401. In the case of the tray locking state, the power supply controller 13 controls the power supply device 7 to start supplying power to the main power operating section 9 and to the host computer 3 in S1402. At this time, in S1403, the power supply controller 13 notifies the CPU 11 that the tray expelling switch 53 has been depressed during shut down of the power supply device 7. More specifically, for example, the CPU 11 has a device for accessing a register on the power supply controller 13; information on the switch changed in state is stored in the register after power-on for the main power operating section 9 or at the time of resetting; and the CPU 11 determines on the basis of the logical state of the switch whether the cause of power-on is depression of the tray expelling switch 53 or a change in logical state of the tray lock detection switch 54 or power-on has been effected by means of the power switch 6 independently of the change in state of the tray expelling switch 53 or the tray lock detection switch 54. The CPU 11 performs no operation or the ejection operation according to the detected power-on factor and the state of the medium tray 52.

If the tray lock detection switch 54 is in the tray locking state after power supply has been started by depressing the tray expelling switch 53, the ejection control section 55 is operated in S1404 to drive the tray lock release device 51 and release the medium tray 52 from the locked state regardless of whether or not the removable medium 1 has been loaded into the information storage device 2. Needless to say, if the removable medium 1 is a disk storage medium rotating at this time, it is expelled after being stopped from rotating. If the removable medium 1 is a non-disk medium such as a semiconductor memory, necessary processing such as access suspension is performed. The medium tray 52 is then expelled out of the information storage device 2 by the action of the elastic member, i.e., a spring or the like, provided between the medium tray 52 and the main body of the information storage device 2. At this time, it is not necessary that the medium tray 52 be completely expelled out of the information storage device 2. If the medium tray 52 is expelled to a certain extent, the user can load or remove the removable medium 1 by completely drawing the medium tray 52 out of the information storage device 2 by his/her hand. After expelling the medium tray 52, the information storage device 2 is set in the standby state in S1405.

If the tray lock detection switch 54 is in the non-tray-locking state when the tray expelling switch 53 is depressed, the power supply controller 13 performs no operation and the power supply device 7 does not start supplying power. Needless to say, an operation to forcibly unlock the tray lock may be performed by considering the possibility of a malfunction of the tray lock detection switch 54, as in the case where power supply is being performed. In such a case, the above-described operations to set the power supply starting factor, start power supply, perform ejection, and cause a transition to the standby mode are performed regardless of the logic of the tray lock detection switch 54.

Figure 14B:
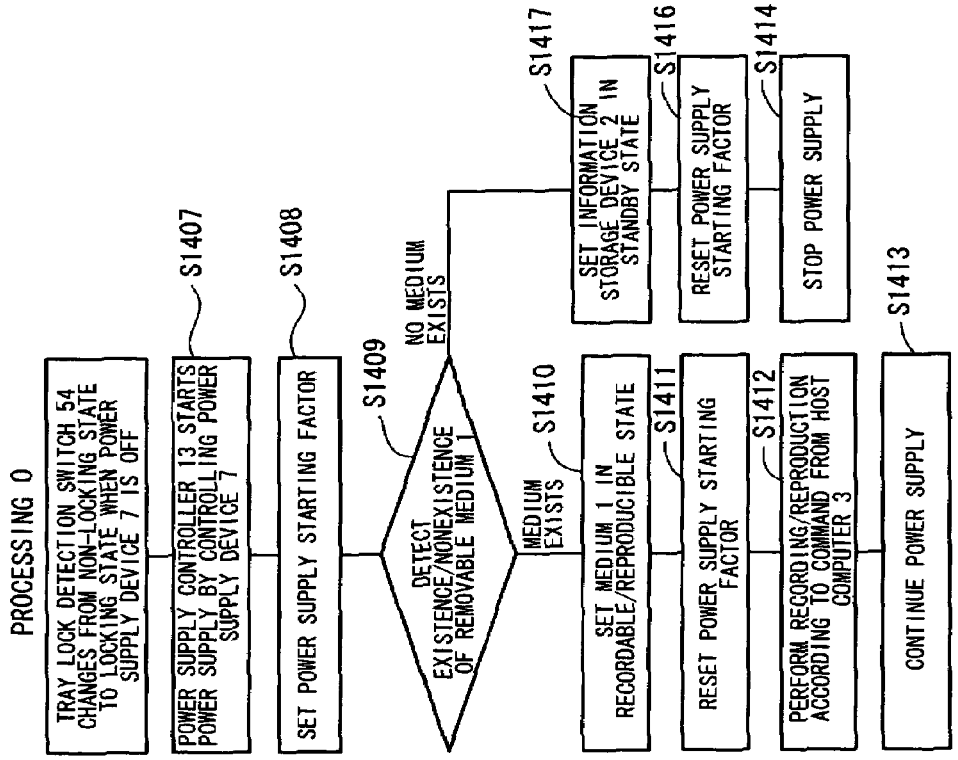
FIG. 14B is a flowchart showing another flow of medium loading/ejection processing in the apparatus shown in FIG. 11.

The operation when the user pushes into the information storage device 2 the medium tray 52 on which the removable medium 1 is placed or not placed and changes the state of the medium tray 52 to the locked state from a state where the medium tray 52 is expelled will next be described. Processing O shown in FIG. 14B is then executed. That is, when the state of the tray lock detection switch 54 is changed from the non-locking state to the locking state, and when the power supply controller 13 detects this change, the power supply controller 13 controls the power supply device 7 to start supplying power to the main power operating section 9 and to the host computer 3 in S1407. At this time, in S1408, the power supply controller 13 notifies the CPU 11 that the tray lock detection switch 54 has been changed from the non-locking state to the locking state during shutdown of the power supply device 7. The main power operating section 9 having the power supply for it started detects the existence/nonexistence of the removable medium 1 under the control of the CPU 11 in S1409. If at this time the removable medium 1 is not placed on the medium tray 52, the information storage device 2 is set in the standby state in S1413. The standby state is a state in which, while power is being supplied to the main power operating section 9 of the information storage device 2, the operations of unnecessary circuit blocks in the information storage device 2 are stopped to limit the power consumption to the least necessary level. If the removable medium 1 is placed on the medium tray 52, it is set in the recordable/reproducible state in S1410. For example, in the CD-R/RW recording/reproduction apparatus, the kind of the medium 1 is identified and adjustment and acquisition of disk information necessary for the recording/reproduction operation according to the kind of the medium 1 are performed to set the medium 1 in the recordable/reproducible state.

Power supply to the main power operating section 9 and to the host computer 3 can be further controlled according to the factor responsible for a start of power supply and the existence/nonexistence of the removable medium 1. For example, in a situation where power supply is started by depressing the tray expelling switch 53 and the operation to release the medium tray 52 from the locked state is performed, or in a situation where the logical state of the tray lock detection switch 54 is changed from the non-locking state to the locking state to start power supply and the absence of the removable medium 1 is detected, the power supply starting factor is reset in S1415 or the information storage device 2 is set in the standby state in S1417 and the power supply starting factor is reset in S1416. Thereafter, the CPU 11 controls the power supply controller 13 to stop the power supply device 7 from supplying power to the main power operating section 9 and to the host computer 3 in S1406 or S1414. Thus, power to the main power operating section 9 and power to the host computer 3 can be shut off after the tray lock release operation has been performed subsequently to pressing of the tray expelling switch 53 in the power supply shutoff state, or in a situation where the medium tray 52 is pushed into the information storage device 2 in the power supply shutoff state and is locked but the removable medium does not exist.

In a situation where the logical state of the tray lock detection switch 54 is changed from the non-locking state to the locking state; power supply is started; and the removable medium 1 exists in the recordable/reproducible state, the power supply controller 13 is controlled to reset and cancel the information on the factor responsible for the start of power supply in S1411, thereby enabling reproduction of data in the removable medium 1 or recording processing to be performed on the host computer 3 (S1412) while continuing power supply from the power supply device 7 (S1413).

Figure 15:
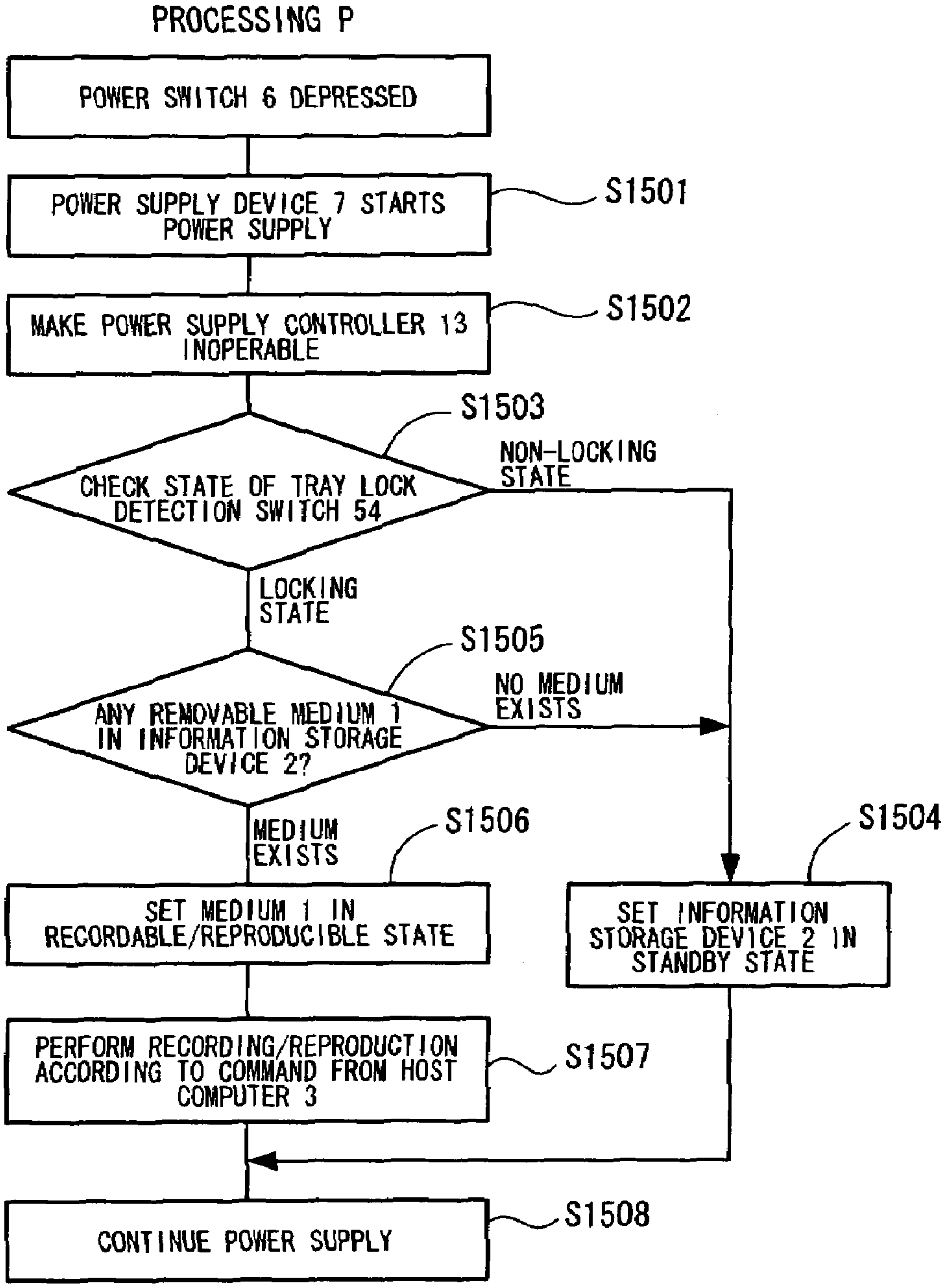
FIG. 15 is a flowchart showing yet another flow of medium loading/ejection processing in the apparatus shown in FIG. 11.

When, as in processing P shown in FIG. 15, the power switch 6 is depressed to start power supply without a change in state of any of the switches, both the power supply device 7 and the continuous power supply device 8 start supplying power from the shutoff state (S1501), and the information storage device 2 is reset in a hardware reset manner to perform the ordinary power-on initialization processing. In this initialization processing, after initialization of the CPU 11, for example, as described above, any factor to start supplying power to the power supply controller 13 is checked, the power supply controller 13 is made inoperable if no power supply starting factor is set (S1502), and the tray lock detection switch 54 is subsequently checked in S1503 to determine whether or not the medium tray 52 is in the locked state. If the medium tray 52 is in the non-locked state, the main power operating section 9 of the information storage device 2 is set in the standby state in S1504. If the medium tray 52 is in the locked state, the existence/nonexistence of the removable medium 1 is detected in S1505.

If the removable medium 1 is not placed on the medium tray 52, the main power operating section 9 of the information storage device 2 is set in the standby state in S1504. If the removable medium 1 is placed on the medium tray 52, it is set in the recordable/reproducible state in S1506. For example, in the CD-R/RW recording/reproduction apparatus, the kind of the medium 1 is identified and adjustment and acquisition of disk information necessary for the recording/reproduction operation according to the kind of the medium 1 are performed to set the medium 1 in the recordable/reproducible state. Thereafter, in S1507, recording on the removable medium 1 or reproduction from the removable medium 1 is performed according to a command from the host computer 3. Even after the completion of these processings, the power supply controller 13 is in the non-operating state. Accordingly, power supply by the power supply device 7 is also continued in S1508.

The operation at the time of power-down is the same as that in Embodiment 1. That is, in the operation in either of the case of power-down of the power supply device 7 under the control of the power supply controller 13 and the case of power-down of the power supply device 7 by operating the power switch 6 as in processing F shown in FIG. 5B, the command from the CPU 11 to make the power supply device 13 inoperative is cancelled in S509 and the power supply controller 13 becomes operative in S510.

Embodiment 3 has been described by way of example with respect to a case where the power supply controller 13 is made operative or inoperative by control through a port from the CPU 11. Embodiment 3, however, can also be implemented by using any of other various methods such as a method of monitoring the power supply condition of the power supply device 7 by the power supply controller 13.

Embodiment 3 has been described by way of example with respect to a case where supply of power to the main power operating section 9 is started by operating the medium expelling switch 53 to perform the operation to release the medium tray 52 from the locked state. Embodiment 3, however, can also be implemented in such a manner that the tray lock release operation is performed by using a forcible tray lock release mechanism without power supply and only the operation when the logic of the tray lock detection switch 54 is changed from the non-locking state to the locking state is performed by the described method in Embodiment 3.

Embodiment 3 has been described by way of example with respect to a case where the information storage device 2 is set in the standby state when the removable medium 1 does not exist in the information storage device 2 in the state where the main power operating section 9 of the information storage device 2 is supplied with power, or when the medium tray 52 is expelled. However, setting in the standby state is an operation performed in ordinary information storage devices 2. Embodiment 3 can also be implemented without setting in the standby state.

Embodiment 3 has been described by way of example with respect to a case where the CPU 11 detects a factor responsible for a start of power supply from information in the register of the power supply controller 13. Embodiment 3, however, can also be implemented by using any arrangement capable of notifying the CPU 11 of a power supply starting factor, e.g., an arrangement in which, after detecting the change in logical state of the tray expelling switch 53 or the tray lock detection switch 54, the power supply controller 13 switches from a terminal connected to the switch 53 or 54 to an output terminal while maintaining the changed logical state, inputs the logical state to the CPU 11, and, after setting the logical state (e.g., L normally set, or H set when the power supply is turned on by the switch factor) for notifying of turning on of power supply through the change in state of the switch by using one terminal connected to the CPU 11, controls the power supply device 7 to start supplying power to the main power operating section 9 and to the host computer 3.

As described above, the power supply controller 13 is incapable of stopping power supply but capable of being implemented as a logic circuit of an extremely simple and small scale and ensuring a power consumption much lower than that in case where power supply is shut off on a block-by-block basis in an IC to supply power only to the necessary block, as in a standby or sleeping state of an ordinary information storage device.

Thus, according to Embodiment 3, in the tray-loading-type information storage device in particular, power is supplied only to the power supply controller 13 when power supply to the host computer 3 and to the main power operating section 9 is stopped, thereby minimizing the power consumption when power supply for the entire apparatus is stopped. Also, power supply is started when required by detecting a change in depressed state of the plurality of switches provided in the information storage device and the loading/ejection operation can be suitably performed according to the logical states of the plurality of switches. Further, the power supply device 7 is controlled according to the performed loading/ejection operation to stop or continue supplying power to the main power operating section 9 and to the host computer 3 with the lowest possible power consumption. Thus, an information processing apparatus and a power supply control method for the information processing apparatus can be provided in which processing according to the contents of the medium can be automatically performed after loading by inserting the medium 1.

Embodiment 4

Embodiment 4 of the present invention will be described below with reference to FIGS. 16, 17, and 18.

Figure 16:
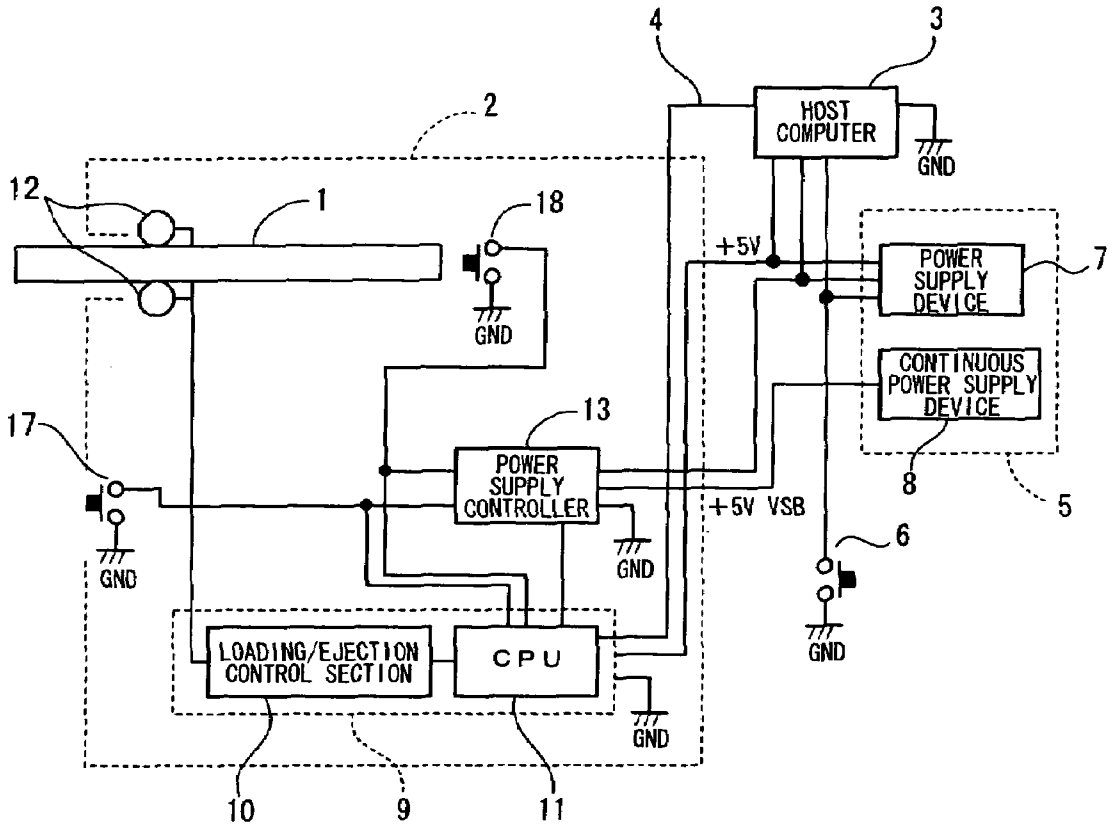
FIG. 16 is a block diagram of an information processing apparatus in Embodiment 4 in which the present invention is applied to a slot-in type of CD-R/RW recording/reproduction apparatus.

FIG. 16 is a block diagram of a configuration in case where the information processing apparatus of the present invention is applied to a slot-in type of CD-R/RW recording/reproduction apparatus. Reference numeral 1 denotes a removable medium, e.g., a CD-ROM/R/RW, a DVD-ROM/R/RW, a DVD-RAM, a DVD-RAM in a cartridge, or a semiconductor memory medium. Embodiment 4 will be described with respect to a case where the removable medium is a CD-R/RW disk.

Referring to FIG. 16, reference numeral 2 denotes an information storage device into which the removable medium 1 is loaded, and which reproduces data from the removable medium 1 or records data on the removable medium 1. Reference numeral 3 denotes a host computer which is connected to the information storage device 2 by an interface device 4, and which performs operations to supply various operating instructions to the information storage device 2 and receive data reproduced in the information storage device 2 through the interface device 4. Ordinarily, the interface device 4 uses a standardized interface, e.g., ATAPI, SCSI, USB or IEEE1394 for communication between the computer 3 and the information storage device 2. Needless to say, the apparatus can be implemented in the same manner by using a device in conformity with a standard other than these standards as the interface device 4 if the device is capable of data/instruction exchange between the host computer 3 and the information storage device 2.

Reference numeral 5 denotes a power supply unit constituted by a power supply device 7 which is turned on/off by a power switch 6, and a continuous power supply device 8 which, even when the power supply switch 6 is operated, continuously supplies power as long as power is supplied to the power supply unit 5. The power supply device 7 supplies power to the host computer 3, to a main power operating section 9 in the information storage device 2 and to a power supply controller 13. The main power operating section 9 in the information storage device 2 is a section for performing main functions of the information storage device 2. The main power operating section 9 includes a loading/ejection control section 10, a CPU 11, a medium transport device 12 and a removable medium reproduction device not shown in the figures. The continuous power supply device 8 supplies power to the power supply controller 13 in the information storage device 2. The power supply controller 13 controls the supply of power performed by the power supply device 7 and controls turning off of the supply of power. The power supply controller 13 operates by being supplied with the least necessary power necessary for operation from the continuous power supply device 8 even when the supply of power to the host computer 3 and the main power operating section 9 is shut off.

Reference numeral 17 denotes a medium expelling switch and reference numeral 18 a medium insertion detection switch. The medium expelling switch 17 is provided on an outer portion of the information storage device 2, and is depressed by a user to perform a medium expelling operation. The medium insertion detection switch 18 is provided in the device 2 to detect insertion of the removable medium 1 into the information storage device 2. When power is being supplied from the power supply device 7 on the basis of the state of the switch detected or a change in the switch state, the CPU 11 connected to the switch 18 determines the necessary processing and operates the loading/ejection control section 10 to drive the medium transport device 12 and thereby perform a loading/ejection operation. The medium transport device 12 is constituted by a combination of rollers for transporting the medium 1 and a spring and gears for transporting the medium 1 in the slot-loading-type information storage device for example.

The actual operation when loading/ejection is performed will next be described in detail.

The operation when power is supplied from the power supply device 7 to the host computer 3 and to the main power operating section 9 is the same as the above-described processing A shown in FIG. 3A and processing B shown in FIG. 3B. When power is supplied only to the power supply device 13 by the continuous power supply device 8 while no power is supplied from the power supply device 7 to each of the host computer 3 and the main power operating section 9, and when the medium switch 17 is depressed, the above-described processing C shown in FIG. 4A is executed. Also, the operation at the time of power-down is the same as the above-described processing F shown in FIG. 5B.

Description will be made below of the operation when the logical state of the medium insertion switch 18 is changed in the case where power is supplied only to the power supply device 13 by the continuous power supply device 8 while no power is supplied from the power supply device 7 to each of the host computer 3 and the main power operating section 9. In this case, processing DX shown in FIG. 17 is executed. That is, the power supply controller 13 first detects the depression of the medium insertion detection switch 18 and starts supplying power to the main power operating section 9 and to the host computer 3 by controlling the power supply device 7 in S401. At this time, the power supply controller 13 notifies the CPU 11 that the logic of the medium insertion detection switch 18 has been changed during shutdown of the power supply device 7 (S402). More specifically, for example, the CPU 11 has a device for accessing a register on the power supply controller 13; information on the switch changed in state is stored in the register after power-on of the main power operating section 9 or at the time of resetting; and the CPU 11 determines on the basis of the logical state of the switch whether the cause of power-on is depression of the medium expelling switch 17 or a change in logical state of the medium insertion detection switch 18 or power-on has been effected by means of the power switch 6 independently of the change in state of the medium expelling switch 17 or the medium insertion detection switch 18.

When powered, the power supply controller 13 starts up the host computer 3 in an instant startup mode for reproducing or processing data in a predetermined format recorded on the removable medium 1 (S1701). In S407, the loading/ejection control section 10 is operated according to the switch logic change in the medium loading sequence based on the structure of the information storage device 2 to drive the medium transport device 12 and draw the removable medium 1 into the information storage device 2.

In S1702, determination is made as to whether or not the removable medium 1 exists in the information storage device 2. If the removable medium 1 exists, it is set in the recordable/reproducible state (S408).

Subsequently, in S1703, determination is made as to whether or not a predetermined kind of data for instant startup is recorded on the medium 1. If the data is recorded, reproduction and processing of the data are automatically started (S1704). In S410, the power supply controller 13 is controlled to reset and cancel the information on the factor responsible for the start of power supply, thereby making the power supply controller 13 inoperable. In the next S411, the supply of power to the main power operating section 9 and to the host computer 3 is continued.

In case where the medium 1 does not exist in the device in S1702 and in case where the predetermined kind of data is not recorded on the medium 1 in S1703, processing described below may be performed. That is, the information storage device 2 is set in the standby state in S1705 and the power supply controller 13 is controlled to reset and cancel the information on the factor responsible for the start of power supply in S1706, thereby making the power supply controller 13 inoperable. In the next S1707, the supply of power to the main power operating section 9 and to the host computer 3 is stopped.

In the case where the predetermined kind of data is not recorded on the medium 1 in S1703, processing described below may also be performed. That is, in S1708, the power supply controller 13 is controlled to reset and cancel the information on the factor responsible for the start of power supply, thereby making the power supply controller 13 inoperable, and the host computer is restarted in the normal mode in the next S1709.

When power supply is started by depressing the power switch 6, startup is performed not in the instant mode but in the normal mode. In this event, power supply is started in S501 from the state in which the power supply device 7 is shut down, as shown in FIG. 18. Accordingly, the ordinary initialization operation at the time of power-on is performed when the information storage device 2 is reset in a hardware reset manner. This initialization operation is performed as described below. After the start of power supply by the power supply device 7, the power supply controller 13 is made inoperable (S502). Also, the host computer 3 is started up not in the instant mode but in the normal mode (S1801). Determination is then made as to whether or not the removable medium 1 has been loaded into the device (S503). If the removable medium 1 has been loaded, the operation to set the medium 1 recordable/reproducible (S504) and the operation to reproduce data in the medium 1 or record data is performed as required according to a command from the host computer 3 (S505). If the removable medium 1 has not been loaded, the information storage device 2 is set in the standby state in S506 and power supply is continued (S507).

Embodiment 4 can be suitably applied to moving images and audio data on DVD-Video, Video CD, CD Audio, etc. Embodiment 4 can also be implemented in applications to other kinds of data such as still images, still images to be reproduced for a slide show, a combination of still images and audio data, and moving image data or audio data compliant with different standards if the data can be reproduced in the instant mode upon startup in advance.

For example, Windows® from Microsoft Corporation, whose main OS portion is recorded on a hard disk, which is loaded into a memory in the host computer main unit for startup, and which therefore requires a comparatively long startup time, is conceivable as data with which startup is performed in the normal mode. For example, a single application which is recorded on a ROM in the main unit, which is provided specially for reproduction from DVD-Video, Video CD and Audio, and with which startup is performed without an OS, and Linux or an OS for an incorporated device capable of high-speed startup are conceivable as data with which startup is performed in the instant mode.

When the host computer 3 is started up in the instant mode, data on the removable medium 1 is automatically reproduced. At this time, fast forward for reproduction, pause, stop, power-off of the information processing apparatus, restart in the normal mode, etc., can be performed by operating a keyboard, a mouse and other input devices provided on the host computer 3. Needless to say, the power-off operation can also be performed by means of the power switch 6 of the information processing apparatus 2.

The power supply for supply of power from the continuous power supply device 7 is a low-capacity power supply, e.g., +5 V VSB compliant with the ATX standard capable of supplying power independently of other power supplies in the main unit. Needless to say, a power supply of 3.3 V or any other voltage can be implemented in the same manner if it is capable of operating the power supply controller 13.

INDUSTRIAL APPLICABILITY

In the information processing apparatus and the power supply control method for the information processing apparatus in accordance with the present invention, power is supplied only to the power supply controller when supply of power to the information storage device and the control device is stopped. Therefore, the power consumption in the entire apparatus when the power supply is stopped can be minimized and the loading/ejection operation can be suitably performed according to a change in logical state of a switch provided on the information storage device by detecting the change in depressed state of the switch and performing power supply as required. Further, the supply of power to the information storage device and the control device is stopped or continued by controlling the power supply device according to the performed loading/ejection operation. Therefore, the present invention is effective as an optical disk recording/reproduction apparatus, a semiconductor memory medium recording/reproduction apparatus or the like designed so that the power consumption is minimized at the time ejection and the information processing apparatus automatically performs processing according to the contents of a medium after loading of the medium by insertion.

The invention claimed is:

1. An information processing apparatus comprising:

an information storage device in which a loading/ejection mechanism for a removable medium is operated according to a change in a depressed state of a switch;

a control device which records data on the removable medium and/or reads out data from the removable medium by controlling the information storage device;

a power supply device capable of performing and stopping power supply to the information storage device and to the control device;

a continuous power supply device capable of supplying power when power supply by the power supply device is stopped; and a power supply controller which operates by being supplied with power from the continuous power supply device, and which, when the depressed state of the switch is changed during stoppage of power supply from the power supply device to the information storage device, controls the information storage device so that the removable medium loading/ejection mechanism is operated, by controlling the power supply device so that the power supply device supplies power to the information storage device or to the information storage device and the control device, wherein:

the power supply controller performs such control that in the case of ejecting the removable medium by controlling the information storage device so that the loading/ejection mechanism is operated, the power supply controller stops power supply from the power supply device after the completion of the ejection operation, and that, in the case of loading the removable medium by controlling the information storage device so that the loading/ejection mechanism is operated, the power supply controller does not stop power supply from the power supply device even after the completion of the loading operation.

2. The information processing apparatus according to claim 1, wherein the power supply controller performs such control that when the removable medium is ejected upon the change in the depressed state of the switch during stoppage of power supply to the information storage device, the power supply controller controls the power supply device to supply power to the information storage device, that, when the removable medium is loaded upon the change in the depressed state of the switch during stoppage of power supply to the information storage device, the power supply controller controls the power supply device to supply power to the information storage device and to the control device, that, in the case of ejecting the removable medium, the power supply controller controls the power supply device to stop power supply to the information storage device after the completion of the ejection operation, and that, in the case of loading the removable medium, the power supply controller does not stop power supply from the power supply device even after the completion of the loading operation.

3. The information processing apparatus according to claim 1, wherein the loading/ejection mechanism for the removable medium ejects the removable medium when operated by depressing a first switch provided on an outer portion of the information storage device, and wherein the loading/ejection mechanism for the removable medium loads the removable medium when operated by changing a depressed state of a second switch provided on an inner portion of the information storage device by insertion of the removable medium, whereby readout of data from the removable medium and/or recording of data on the removable medium is enabled.

4. The information processing apparatus according to claim 3, further comprising a logic holding device which holds the logical state of the first switch when depression of the first switch is detected during stoppage of power supply from the power supply device to the information storage device, and which cancels the held logical state when the loading/ejection mechanism for the removable medium is operated to load or eject the removable medium, wherein the loading/ejection mechanism for the removable medium performs the loading or ejection operation according to an output from the logic holding device and the logic of the second switch.

5. The information processing apparatus according to claim 3, wherein the power supply controller controls the power supply device so that if the second switch is set in the original state as result of the change in the depressed state of the second switch when power is supplied to the information storage device according to the change in the depressed state of the second switch, the power supply device stops supplying power to the information storage device or to the information storage device and the control device to which power has been supplied, without operating the loading/ejection mechanism for the removable medium.

6. An information processing apparatus comprising:

an information storage device in which a loading/ejection mechanism for a removable medium is operated according to a change in a depressed state of a first switch;

a control device which records data on the removable medium and/or reads out data from the removable medium by controlling the information storage device;

a power supply device capable of performing and stopping power supply to the information storage device and to the control device;

a continuous power supply device capable of supplying power when power supply by the power supply device is stopped;

a power switch with which power supply to the power supply device is started and stopped, and with which, at the time of starting power supply, the control device is started up in a normal startup mode in which general-purpose processing can be performed by a user program executed on an OS; and a power supply controller which operates by being supplied with power from the continuous power supply device, and which, when the depressed state of a second switch provided on an outer portion or an inner portion of the information storage device is changed during stoppage of power supply from the power supply device to the information storage device, controls the power supply device so that the power supply device supplies power to the information storage device or to the information storage device and the control device, thereafter starts up the control device in an instant startup mode for reproducing or processing data in a predetermined format recorded on the removable medium, and controls the information storage device so that the removable medium loading/ejection mechanism is operated according to the change in the depressed state of the second switch, wherein:

the power supply controller performs such control that in the case of ejecting the removable medium by controlling the information storage device so that the loading/ejection mechanism is operated, at the time of startup in the instant startup mode, the power supply controller stops power supply from the power supply device after the completion of the ejection operation, that, if the removable medium does not exist in the information storage device, the power supply controller stops power supply from the power supply device, and that, in the case of loading the removable medium by controlling the information storage device so that the loading/ejection mechanism is operated, the power supply controller does not stop power supply from the power supply device even after the completion of the loading operation.

7. The information processing apparatus according to claim 6, wherein the control device performs such control as to identify the kind of data on the removable medium at the time of startup in the instant startup mode, perform reproduction or processing of the data if the data is recorded in a predetermined format, and stop power supply by controlling the power supply device if no data is recorded in the predetermined format.

8. The information processing apparatus according to claim 6, wherein the control device performs such control as to identify the kind of data on the removable medium at the time of startup in the instant startup mode, perform reproduction or processing of the data if the data is recorded in a predetermined format, and restart in the normal mode if no data is recorded in the predetermined format.

9. The information processing apparatus according to claim 6, wherein the data in the predetermined format is data compliant with a moving picture/audio data standard such as DVD-Video, Video CD and CD Audio.

10. The information processing apparatus according to claim 6, wherein the loading/ejection mechanism for the removable medium ejects the removable medium when operated by depressing a first switch provided on an outer portion of the information storage device, and wherein the loading/ejection mechanism for the removable medium loads the removable medium when operated by changing a depressed state of a second switch provided on an inner portion of the information storage device by insertion of the removable medium, whereby readout of data from the removable medium and/or recording of data on the removable medium is enabled.

11. The information processing apparatus according to claim 10, further comprising a logic holding device which holds the logical state of the first switch when depression of the first switch is detected during stoppage of power supply from the power supply device to the information storage device, and which cancels the held logical state when the loading/ejection mechanism for the removable medium is operated to load or eject the removable medium wherein the loading/ejection mechanism for the removable medium performs the loading or ejection operation according to an output from the logic holding device and the logic of the second switch.

12. The information processing apparatus according to claim 10, wherein the power supply controller controls the power supply device so that if the second switch is set in the original state as result of the change in the depressed state of the second switch when power is supplied to the information storage device according to the change in the depressed state of the second switch, the power supply device stops supplying power to the information storage device or to the information storage device and the control device to which power has been supplied without operating the loading/ejection mechanism for the removable medium.

13. A power supply control method for an information processing apparatus having an information storage device in which a loading/ejection mechanism for a removable medium is operated according to a change in a depressed state of a switch;

a control device which records data on the removable medium and/or reads out data from the removable medium by controlling the information storage device;

a power supply device capable of performing and stopping power supply to the information storage device and to the control device; and a continuous power supply device capable of supplying power when power supply by the power supply device is stopped, the method comprising, when the depressed state of the switch is changed during stoppage of power supply from the power supply device to the information storage device, controlling the information storage device so that the removable medium loading/ejection mechanism is operated, by controlling, by means of a power supply controller which operates by being supplied with power from the continuous power supply device, the power supply device so that the power supply device supplies power to the information storage device or to the information storage device and the control device, wherein:

the power supply controller performs such control that in the case of ejecting the removable medium by controlling the information storage device so that the loading/ejection mechanism is operated, the power supply controller stops power supply from the power supply device after the completion of the ejection operation, and that, in the case of loading the removable medium by controlling the information storage device so that the loading/ejection mechanism is operated, the power supply controller does not stop power supply from the power supply device even after the completion of the loading operation.

14. The power supply control method for the information processing apparatus according to claim 13, wherein the power supply controller performs such control that when the removable medium is ejected upon the change in the depressed state of the switch during stoppage of power supply to the information storage device, the power supply controller controls the power supply device to supply power to the information storage device, that, when the removable medium is loaded upon the change in the depressed state of the switch during stoppage of power supply to the information storage device, the power supply controller controls the power supply device to supply power to the information storage device and to the control device, that, in the case of ejecting the removable medium, the power supply controller controls the power supply device to stop power supply to the information storage device after the completion of the ejection operation, and that, in the case of loading the removable medium, the power supply controller does not stop power supply from the power supply device even after the completion of loading.

15. The power supply control method for the information processing apparatus according to claim 13, wherein the loading/ejection mechanism for the removable medium ejects the removable medium when operated by depressing a first switch provided on an outer portion of the information storage device, and the loading/ejection mechanism for the removable medium loads the removable medium when operated by changing a depressed state of a second switch provided on an inner portion of the information storage device by insertion of the removable medium.

16. The power supply control method for the information processing apparatus according to claim 15, wherein a logical state of the first switch is held when depression of the first switch is detected during stoppage of power supply from the power supply device to the information storage device, and the held logical state is canceled when the loading/ejection mechanism for the removable medium is operated to load or elect the removable medium, and the loading/ejection mechanism for the removable medium is made to perform the loading or ejection operation according to the logical state and the logic of the second switch.

17. The power supply control method for the information processing apparatus according to claim 15, wherein the power supply controller controls the power supply device so that when the second switch is set in the original state as a result of the change in the depressed state of the second switch when power is supplied to the information storage device according to the change in the depressed state of the second switch, the power supply device stops supplying power to the information storage device or to the information storage device and the control device to which power has been supplied, without operating the loading/ejection mechanism for the removable medium.

18. A power supply control method for an information processing apparatus having an information storage device in which a loading/ejection mechanism for a removable medium is operated according to a change in a depressed state of a first switch;

a control device which records data on the removable medium and/or reads out data from the removable medium by controlling the information storage device;

a power supply device capable of performing and stopping power supply to the information storage device and to the control device;

a power switch with which start-stop control of power supply by the power supply device is performed;

a continuous power supply device capable of supplying power when power supply by the power supply device is stopped, and a power supply controller which operates by being supplied with power from the continuous power supply device, the method comprising:

in the case of staring power supply from the power supply device by control with the power switch, starting up the control device in a normal startup mode in which general-purpose processing can be performed by a user program executed on an OS;

when the depressed state of a second switch provided on an outer portion or an inner portion of the information storage device is changed during stoppage of power supply from the power supply device to the information storage device, controlling by the power supply controller the power supply device so that the power supply device supplies power to the information storage device or to the information storage device and the control device, and starting up the control device in an instant startup mode for reproducing or processing data in a predetermined format recorded on the removable medium; and controlling the information storage device under a command from the power supply controller so that the removable medium loading/ejection mechanism is operated according to the depressed state of the second switch, wherein:

the power supply controller performs such control that in the case of ejecting the removable medium by controlling the information storage device so that the loading/ejection mechanism is operated, at the time of startup in the instant startup mode, the power supply controller stops power supply from the power supply device after the completion of the ejection operation, that, if the removable medium does not exist in the information storage device, the power supply controller stops power supply from the power supply device, and that, in the case of loading the removable medium by controlling the information storage device so that the loading/ejection mechanism is operated, the power supply controller continues power supply from the power supply device even after the completion of the loading operation.

19. The power supply control method for the information processing apparatus according to claim 18, wherein the control device controls the information storage device to identify the kind of data on the removable medium at the time of startup in the instant startup mode, perform reproduction or processing of the data if the data is recorded in a predetermined format, and stop power supply by controlling the power supply device if no data is recorded in the predetermined format.

20. The power supply control method for the information processing apparatus according to claim 18, wherein the control device controls the information storage device to identify the kind of data on the removable medium at the time of startup in the instant startup mode, perform reproduction or processing of the data if the data is recorded in a predetermined format, and restart in the normal mode if no data is recorded in the predetermined format.

21. The power supply control method for the information processing apparatus according to claim 18, wherein the data in the predetermined format is data compliant with a moving picture/audio data standard such as DVD-Video, Video CD and CD Audio.

22. The power supply control method for the information processing apparatus according to claim 18, wherein the loading/ejection mechanism for the removable medium ejects the removable medium when operated by depressing a first switch provided on an outer portion of the information storage device, and the loading/ejection mechanism for the removable medium loads the removable medium when operated by changing a depressed state of a second switch provided on an inner portion of the information storage device by insertion of the removable medium.

23. The power supply control method for the information processing apparatus according to claim 22, wherein a logical state of the first switch is held when depression of the first switch is detected during stoppage of power supply from the power supply device to the information storage device, and the held logical state is canceled when the loading/ejection mechanism for the removable medium is operated to load or eject the removable medium, and the loading/ejection mechanism for the removable medium is made to perform the loading or ejection operation according to the logical state and the logic of the second switch.

24. The power supply control method for the information processing apparatus according to claim 22, wherein the power supply controller controls the power supply device so that when the second switch is set in the original state as a result of the change in the depressed state of the second switch when power is supplied to the information storage device according to the change in the depressed state of the second switch, the power supply device stops supplying power to the information storage device or to the information storage device and the control device to which power has been supplied, without operating the loading/ejection mechanism for the removable medium.

25. An information storage device in which a loading/ejection mechanism for a removable medium is operated according to a change in a depressed state of a switch, wherein the information storage device is controlled by a control device so as to record data on the removable medium and/or read out data from the removable medium, the information storage device is connected to a power supply device capable of performing and stopping power supply to the information storage device and to the control device, the information storage device comprises a power supply controller which operates by being supplied with power from a continuous power supply device capable of supplying power when power supply by the power supply device is stopped, and which, when the depressed state of the switch is changed during stoppage of power supply from the power supply device to the information storage device, controls the information storage device so that the removable medium loading/ejection mechanism is operated, by controlling the power supply device so that the power supply device supplies power to the information storage device or to the information storage device and the control device, wherein:

the power supply controller performs such control that in the case of ejecting the removable medium by controlling the information storage device so that the loading/ejection mechanism is operated, the power supply controller stops power supply from the power supply device after the completion of the ejection operation, and that, in the case of loading the removable medium by controlling the information storage device so that the loading/ejection mechanism is operated, the power supply controller does not stop power supply from the power supply device even after the completion of the loading operation.

26. The information storage device according to claim 25, wherein the power supply controller performs such control that when the removable medium is ejected upon the change in the depressed state of the switch during stoppage of power supply to the information storage device, the power supply controller controls the power supply device to supply power to the information storage device, when the removable medium is loaded upon the change in the depressed state of the switch during stoppage of power supply to the information storage device, the power supply controller controls the power supply device to supply power to the information storage device and to the control device, when the removable medium is ejected, the power supply controller controls the power supply device to stop power supply to the information storage device after the completion of the ejection operation, and when the removable medium is loaded, the power supply controller does not stop power supply from the power supply device even after the completion of the loading operation.

27. The information storage device according to claim 25, wherein the loading/ejection mechanism for the removable medium ejects the removable medium when operated by depressing a first switch provided on an outer portion of the information storage device, and the loading/ejection mechanism for the removable medium loads the removable medium when operated by changing a depressed state of a second switch provided on an inner portion of the information storage device by insertion of the removable medium, whereby readout of data from the removable medium and/or recording of data on the removable medium is enabled.

28. The information storage device according to claim 27, further comprising a logic holding device which holds the logical state of the first switch when depression of the first switch is detected during stoppage of power supply from the power supply device to the information storage device, and which cancels the held logical state when the loading/ejection mechanism for the removable medium is operated to load or eject the removable medium, wherein the loading/ejection mechanism for the removable medium performs the loading or ejection operation according to an output from the logic holding device and the logic of the second switch.

29. The information storage device according to claim 27, wherein the power supply controller controls the power supply device so that when the second switch is set in the original state as a result of the change in the depressed state of the second switch when power is supplied to the information storage device according to the change in the depressed state of the second switch, the power supply device stops supplying power to the information storage device or to the information storage device and the control device to which power has been supplied, without operating the loading/ejection mechanism for the removable medium.

30. An information storage device in which a loading/ejection mechanism for a removable medium is operated according to a change in a depressed state of a first switch, comprising:

a control device for controlling the information storage device so as to record data on the removable medium and/or read out data from the removable medium, a power supply device connected to the information storage device and being capable of performing and stopping power supply to the information storage device and to the control device, and a power switch for starting and stopping power supply by the power supply device, the power switch starting up the control device in a normal startup mode in which general-purpose processing can be performed by a user program executed on an OS upon start of power supply, wherein the information storage device further comprises a power supply controller which operates by being supplied with power from a continuous power supply device capable of supplying power even when power supply by the power supply device is stopped, and which, when the depressed state of a second switch provided on an outer portion or an inner portion of the information storage device is changed during stoppage of power supply from the power supply device to the information storage device, controls the power supply device so that the power supply device supplies power to the information storage device or to the information storage device and the control device, thereafter starts up the control device in an instant startup mode for reproducing or processing data in a predetermined format recorded on the removable medium, and controls the information storage device so that the removable medium loading/ejection mechanism is operated according to the change in the depressed state of the second switch, wherein:

the power supply controller performs such control, at the time of startup in the instant startup mode, that when the removable medium is ejected by controlling the information storage device so that the loading/ejection mechanism is operated, the power supply controller stops power supply from the power supply device after the completion of the ejection operation, when the removable medium does not exist in the information storage device, the power supply controller stops power supply from the power supply device, and when the removable medium is loaded by controlling the information storage device so that the loading/ejection mechanism is operated, the power supply controller does not stop power supply from the power supply device even after the completion of the loading operation.

31. The information storage device according to claim 30, wherein the power supply controller performs such control as to identify the kind of data on the removable medium at the time of startup in the instant startup mode, to perform reproduction or processing of the data when the data is recorded in a predetermined format, and to stop power supply by controlling the power supply device when no data is recorded in the predetermined format.

32. The information storage device according to claim 30, wherein the power supply controller performs such control as to identify the kind of data on the removable medium at the time of startup in the instant startup mode, to perform reproduction or processing of the data when the data is recorded in a predetermined format, and to restart in the normal startup mode when no data is recorded in the predetermined format.

33. The information storage device according to claims 30, wherein the data in the predetermined format is data compliant with a moving picture/audio data standard such as DVD-Video, Video CD and CD Audio.

34. The information storage device according to claim 30, wherein the loading/ejection mechanism for the removable medium ejects the removable medium when operated by depressing a first switch provided on an outer portion of the information storage device, and the loading/ejection mechanism for the removable medium loads the removable medium when operated by changing a depressed state of a second switch provided on an inner portion of the information storage device by insertion of the removable medium, whereby readout of data from the removable medium and/or recording of data on the removable medium is enabled.

35. The information storage device according to claim 34, further comprising a logic holding device which holds the logical state of the first switch when depression of the first switch is detected during stoppage of power supply from the power supply device to the information storage device, and which cancels the held logical state when the loading/ejection mechanism for the removable medium is operated to load or eject the removable medium, wherein the loading/ejection mechanism for the removable medium performs the loading or ejection operation according to an output from the logic holding device and the logic of the second switch.

36. The information storage device according to claim 34, wherein the power supply controller controls the power supply device so that when the second switch is set in the original state as a result of the change in the depressed state of the second switch when power is supplied to the information storage device according to the change in the depressed state of the second switch, the power supply device stops supplying power to the information storage device or to the information storage device and the control device to which power has been supplied, without operating the loading/ejection mechanism for the removable medium.

* * * * *